US012177330B2

(12) United States Patent
Chevallier-Mames et al.

(10) Patent No.: US 12,177,330 B2
(45) Date of Patent: Dec. 24, 2024

(54) COMPUTATIONAL NETWORK CONVERSION FOR FULLY HOMOMORPHIC EVALUATION

(71) Applicant: ZAMA SAS, Paris (FR)

(72) Inventors: Benoit Chevallier-Mames, Paris (FR); Pascal Gilbert Yves Paillier, Paris (FR)

(73) Assignee: ZAMA SAS, Paris (FR)

( * ) Notice: Subject to any disclaimer, the term of this patent is extended or adjusted under 35 U.S.C. 154(b) by 0 days.

(21) Appl. No.: 18/565,930

(22) PCT Filed: Jun. 3, 2022

(86) PCT No.: PCT/EP2022/065196
§ 371 (c)(1),
(2) Date: Nov. 30, 2023

(87) PCT Pub. No.: WO2022/254010
PCT Pub. Date: Dec. 8, 2022

(65) Prior Publication Data
US 2024/0259181 A1    Aug. 1, 2024

(30) Foreign Application Priority Data
Jun. 4, 2021 (EP) .................... 21290037

(51) Int. Cl.
*H04L 9/00* (2022.01)
*G06F 7/544* (2006.01)
*G06F 17/16* (2006.01)

(52) U.S. Cl.
CPC ............ *H04L 9/008* (2013.01); *G06F 7/544* (2013.01); *G06F 17/16* (2013.01); *G06F 2207/4824* (2013.01)

(58) Field of Classification Search
CPC .......... H04L 9/08; G06F 7/544; G06F 17/16; G06F 2207/4824
(Continued)

(56) References Cited

U.S. PATENT DOCUMENTS

2015/0326392 A1* 11/2015 Cheng .................... H04L 9/14
                                                            380/28
2017/0293913 A1* 10/2017 Gulak ................. G06Q 20/3829
(Continued)

FOREIGN PATENT DOCUMENTS

CN    102314580 A  *  1/2012
CN    105009505 A  * 10/2015 ............. G06F 17/16
(Continued)

OTHER PUBLICATIONS

Shafieinejad et al., "Equi-Joins Over Encrypted Data for Series of Queries", arXiv:2103.05792, Mar. 10, 2021. (Year: 2021).*
(Continued)

*Primary Examiner* — Peter C Shaw
(74) *Attorney, Agent, or Firm* — NIXON & VANDERHYE P.C.

(57) ABSTRACT

Some embodiments are directed to a computer-implemented method for converting a first computation network of operations arranged to compute a function into a second computation network of FHE operations arranged to compute the same function. For example, a set of expansion factors ($\alpha_i$) may be determined for matrix operations in the first computation network. Real-valued matrices may be converted by scaling the real-valued matrices with their corresponding expansion factor and rounding. An accuracy measure for the second computation network can be iteratively optimized.

14 Claims, 7 Drawing Sheets

(58) Field of Classification Search
USPC .......................................................... 380/28
See application file for complete search history.

(56) References Cited

U.S. PATENT DOCUMENTS

| | | | |
|---|---|---|---|
| 2019/0386814 A1 | 12/2019 | Ahmed | |
| 2020/0201910 A1* | 6/2020 | Gavaudan | ............. G06Q 20/32 |

FOREIGN PATENT DOCUMENTS

| | | | | |
|---|---|---|---|---|
| CN | 108632033 | | 10/2018 | |
| CN | 109787743 | | 5/2019 | |
| CN | 110266721 | A * | 9/2019 | |
| CN | 111492615 | | 8/2020 | |
| CN | 111543025 | | 8/2020 | |
| EP | 4024810 | A1 * | 7/2022 | ......... H04L 63/0807 |
| JP | 2019-113761 | | 7/2019 | |
| JP | 2020-190614 | | 11/2020 | |
| WO | WO-2012149395 | A1 * | 11/2012 | ............. H04L 9/008 |

OTHER PUBLICATIONS

Biskup et al., "Secure Mediation of Join Queries by Processing Ciphertexts," 2007 IEEE 23rd International Conference on Data Engineering Workshop, Istanbul, Turkey, 2007, pp. 715-724, doi: 10.1109/ICDEW.2007.4401059. (Year: 2007).*

Gai et al., "Blend Arithmetic Operations on Tensor-Based Fully Homomorphic Encryption Over Real Numbers," in IEEE Transactions on Industrial Informatics, vol. 14, No. 8, pp. 3590-3598, Aug. 2018, doi: 10.1109/TII.2017.2780885. (Year: 2017).*

Singh et al., "Homomorphic Encryption: Hands Inside the Gloves," 2023 3rd International Conference on Innovative Mechanisms for Industry Applications (ICIMIA), Bengaluru, India, 2023, pp. 248-253, doi: 10.1109/ICIMIA60377.2023.10426576. (Year: 2023).*

Ravindran et al., "A hybrid Improved Fully Homomorphic Encryption with AES to provide high security in Cloud Computing," 2023 (ICSES), Chennai, India, 2023, pp. 1-9, doi: 10.1109/ICSES60034.2023.10 (Year: 2023).*

Dimitoglou et al., "Performance Evaluation of Partially Homomorphic Encryption Algorithms," 2022 International Conference on Computational Science and Computational Intelligence (CSCI), Las Vegas, NV, USA, 2022, pp. 910-915, doi: 10.1109/CSCI58124.2022.00163. (Year: 2022).*

Gerasimov et al., "Research of homomorphic encryption algorithms over integers," 2017 IEEE Conference of Russian Young Researchers in Electrical and Electronic Engineering (EIConRus), St. Petersburg and Moscow, Russia, 2017, pp. 398-403, doi: 10.1109/EIConRus.2017.7910576. (Year: 2017).*

Gai et al., "Advanced Fully Homomorphic Encryption Scheme Over Real Numbers," 2017 IEEE 4th International Conference on Cyber Security and Cloud Computing (CSCloud), New York, NY, USA, 2017, pp. 64-69, doi: 10.1109/CSCloud.2017.61.' (Year: 2017).*

Ilaria Chillotti et al., "TFHE: Fast Fully Homomorphic Encryption Over the Torus*", Journal of Cryptology, vol. 33, 2020, pp. 34-91.

Christian Szegedy et al., "Going Deeper with Convolutions, 2015 IEEE Conference on Computer Vision and Pattern Recognition (CVPR)", Jun. 7-12, 2015, 9 pages.

Craig Gentry, "Fully Homomorphic Encryption Using Ideal Lattices", STOC '09: Proceedings of the forty-first annual ACM symposium on Theory of computing, May 31, 2009, pp. 169-178.

Florian Bourse et al., "Fast Homomorphic Evaluation of Deep Discretized Neural Networks", 38th Annual International Cryptology Conference, Santa Barbara, CA, USA, Aug. 19-23, 2018, Proceedings, Part III, 30 pages.

Ilaria Chillotti et al., "Programmable Bootstrapping Enables Efficient Homomorphic Inference of Deep Neural Networks", Lecture Notes in Computer Science (LNCS), vol. 12716, Jul. 1, 2021, 18 pages.

Nathan Dowlin et al., "CryptoNets: Applying Neural Networks to Encrypted Data with High Throughput and Accuracy", Proceedings of the 33rd International Conference on Machine Learning, PMLR, vol. 48, 2016, 10 pages.

Gavril Ognjanovski, "Everything you need to know about Neural Networks and Backpropagation-Machine Learning Easy and Fun", Toward Data Science, Jan. 14, 2019, 25 pages, at URL: https://towardsdatascience.com/everything-you-need-to-know-about-neural-networks-and-backpropagation-machine-learning-made-easy-e5285bc2be3a.

International Search Report and Written Opinion for PCT/EP2022/065196, mailed Oct. 5, 2022, 16 pages.

Notice of Reasons for Rejection, JP Application No. 2023-5784426, May 28, 2024.

CN Application No. 2022800392104 Search Report (Jun. 3, 2022).

CN Application No. 202280039210.4, Official Action, Jul. 13, 2024.

Kim, Miran et al; "HEAR: Human Action Recognition via Neural Networks on Homomorphically Encrypted Data," Nature Communications (2022) 13:4799.

Dathathri, Roshan, et al; "CHET: An Optimizing Compiler for Fully-Homomorphic Neural-Network Interencing," PLDI '19, Jun. 22-26, 2019, Phoenix, AZ, USA.

* cited by examiner

COMPUTATIONAL NETWORK CONVERSION FOR FULLY HOMOMORPHIC EVALUATION

CROSS-REFERENCE TO RELATED APPLICATIONS

This application is the U.S. national phase of International Application No. PCT/EP2022/065196 filed Jun. 3, 2022, which designated the U.S. and claims priority to EP 21290037.7 filed Jun. 4, 2021, the entire contents of each of which are hereby incorporated by reference.

TECHNICAL FIELD

The presently disclosed subject matter relates to computer-implemented method for converting a first computation network of operations arranged to compute a function into a second computation network of fully homomorphic encrypted operations arranged to compute the same function, a computer readable medium, a system for converting a first computation network of operations arranged to compute a function into a second computation network of fully homomorphic encrypted operations arranged to compute the same function.

BACKGROUND

Ever since Craig Gentry's breakthrough paper "Fully Homomorphic Encryption Using Ideal Lattices" (Full version in *Commun. ACM* 53(3):97-105, 2010; included herein by reference) there has been a continued effort to make Fully Homomorphic Encryption (FHE) sufficiently secure and efficient for real-world applications. An FHE allows one to perform computations, e.g., evaluate circuits, over encrypted data without being able to decrypt. For example, input data and computation result may be received and returned in encrypted form. Intermediate data, e.g., an internal state of the computation, may also be in encrypted form.

Even though the result of the computation is returned in an encrypted form, when decrypted the output is the same as if the operations had been performed on the unencrypted data. Homomorphic encryption can be used for privacy-preserving outsourced storage and computation. This allows data to be encrypted and out-sourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease, or other disorder. Using homomorphic encryption, the medical model may be applied to medical data that is received in encrypted form. This means that the party that evaluates the medical model does not have access to the plain medical data that corresponds to the encrypted medical data. The user of the service can decrypt the result of the medical model application.

A cryptosystem that supports arbitrary computations on ciphertexts is known as a fully homomorphic encryption (FHE) scheme. Such a scheme enables the evaluation of a wide range of functions, and which can be run on encrypted inputs to produce an encryption of the result. For example, so-called functional completeness can be obtained once a combination of and-gates and or-gates are available as this allows one to implement any Boolean circuit. Such a circuit can be run by an untrusted party without revealing its inputs and internal state and output. A fully homomorphic encryption may be leveled, in which case the number of certain operations cannot exceed a predetermined threshold. A leveled fully homomorphic scheme may be converted to an unleveled FHE scheme by performing bootstrapping operations. A bootstrapping operation increases the number of operations than can be performed on an encrypted data item.

A fully homomorphic encryption scheme may support computations expressed in some special form, e.g., as a Boolean or arithmetic circuit. For example, a leveled fully homomorphic encryption scheme may support the evaluation of arbitrary circuits but of a bounded, pre-determined, depth. Unleveled fully homomorphic encryption (FHE) allows the evaluation of arbitrary circuits of unbounded depth. A leveled FHE scheme may be converted to an unleveled FHE scheme by periodic execution of a bootstrapping operation on data. It is known how to compile a computation, e.g., a function, in the form of a circuit.

Since Gentry's paper many FHE schemes have been developed, bringing computation times down with multiple orders of magnitude. Now, many FHE schemes are known. A more recent example of an FHE scheme is described in the paper "TFHE: Fast Fully Homomorphic Encryption over the Torus" by Ilaria Chillotti, et al. (J. Cryptology 33(1):34-91, 2020), included herein by reference.

A preferred FHE scheme is described in the paper "Programmable Bootstrapping Enables Efficient Homomorphic Inference of Deep Neural Networks" by Ilaria Chillotti, Marc Joye and Pascal Paillier, see Cryptology ePrint Archive: Report 2021/091, which is included herein by reference. This paper operates on elements of a torus, e.g., it is a torus type FHE scheme (TFHE).

As efficient FHE schemes become increasingly available, there is an increased interest in converting computations that were initially developed for conventional non-encrypted evaluation into a computation using FHE. Such a conversion is always possible, especially with the advance of the so-called programmable bootstrapping (PBS), a bootstrapping operation that also executes a pre-determined function that can be chosen by the designer of the FHE computation. Nevertheless, there is a desire to run as much as possible the operations of the original computation as operations that can be directly performed on encrypted values without having to use a programmable bootstrapping.

Unfortunately, many FHE schemes, in particular TFHE schemes, impose restrictions on the operations that can be directly performed on encrypted values, e.g., as an encrypted operation with a computation cost comparable to the original non-encrypted computation. For example, addition of two encrypted values is often directly possible, in particular, this is possible in torus-based schemes. Multiplication between a plain integer and an encrypted value is also frequently possible; which can be expected since a multiplication by an integer n can be seen as a repeated addition of n copies of the encrypted value. Addition and integer multiplication are natively possible, for example, in TFHE, where 'T' stands for Torus. The cryptographic scheme TFHE uses a mathematical structure called the Torus. An example of a torus is $\mathbb{R}/\mathbb{Z}$, e.g., the real numbers modulo 1 (other moduli are possible, but 1 is convenient). Values on the torus are often represented, in practical implementation, as a suitable finite ring, e.g., $\mathbb{Z}/m\mathbb{Z}$, where m is a modulus, e.g., the integers modulo a modulus. The integer modulus m is typically a power of two, e.g., $2^q$, where q might be, e.g., 32 or 64, and is generally less than or equal to 128. Encryption of a torus value may be done as in the particular scheme; e.g., as in the above quoted paper "Programmable Bootstrapping Enables Efficient Homomorphic Inference of Deep Neural Networks".

However, multiplication of a plain non-integral value and an encrypted value is not always possible. In particular, in torus-based schemes it is a known difficulty that a multiplication with a non-integer number as an encrypted value is undefined.

Unfortunately, in the large class of computations called neural networks, multiplications with non-integrals happen very frequently, e.g., as part of multi-sums, matrix multiplications, convolutions, batch normalizations, and the like. Conversion of computation networks such as neural networks into FHE computational networks needs improvement.

SUMMARY

There is a desire to run computational networks, say a first computational network, not necessarily restricted to neural networks, that are based on conventional arithmetical operations, on encrypted data using FHE operations. To improve the efficiency of such a converted computational network, e.g., a second computational network, it is desirable if operations run directly on encrypted values, without, e.g., requiring the use of a programmable bootstrapping.

For example, the first computation network using conventional operations may comprise a plurality of real-valued matrix operations (y=W·x) comprising a real-valued matrix multiplication and also a plurality of further operations, in particular operations that use a result of a matrix operation as input. An aim may be to convert the matrix operation so that it avoids multiplications between a real number and an encrypted value and instead uses an integer times an encrypted value. An operation that is converted to use only multiplications of encrypted values by plain integers and additions of encrypted values to plain integers or plain real numbers can be implemented in the second computation network as native FHE operations, e.g., an FHE operation without a programmable bootstrapping. The real numbers in a matrix operation in the first computation network, e.g., the multiplication or the addition, may be floating-point numbers, or fixed-point numbers.

Typically, the real numbers defining an operation may be unencrypted both in the first computational network and in the second computational network. In a typically embodiment, the majority of the real numbers in an operation in the first computational network are not integral, e.g., at least 50%, 75%, or substantially all of the real numbers defining an operation, e.g., a matrix operation. As shown herein, for linear operations this conversion is always possible. For other operations, avoiding multiplication by a real number may not always be possible or desirable. The further operations that may be in the first computational network, can then be translated using one or more programmable bootstrappings.

One way to convert a matrix operation to avoid a multiplication between a real number and an encrypted value, is to multiply the matrix of the matrix multiplication with a real-valued constant, called an expansion factor (typically denoted alpha), and then to round the matrix. Directly rounding the values might reduce the accuracy too much. As a result the values resulting from the matrix multiplication are also multiplied by the expansion factor; however the other operations may be adjusted for this. For example, real values that need to be added to multiplication results may be multiplied with the expansion factor as well: for example, if the operation is a matrix multiplication with a bias (y=W·x+B), then B is multiplied by the expansion factor as well, such that the values resulting from the matrix multiplication with bias are still the original values multiplied by the expansion factor. Other operations, e.g., the further operations, may be adjusted to expect an input that has been multiplied with the expansion factor. For example, such functions could be adjusted as the composition of the original function with a division by the expansion factor (e.g., function A(x) may be replaced by A(x/a)). Note that the FHE scheme may not directly support division by the expansion factor, but this is not a problem if the further operation is implemented as a programmable bootstrapping.

In an embodiment, an accuracy measure is determined for the converted second computation network. The conversion by expansion factors can introduce inaccuracies, since a rounding operation, even after multiplication with an expansion factor does not yield exactly the same value. Such inaccuracies are smaller for larger expansion factors. In other words, increasing the expansion factor improves accuracy, e.g., making the accuracy of the second computational network closer to the accuracy of the first network. On the other hand, at some point, if the expansion factor is too large, the accuracy starts to decline since values tend to become large and so other problems with precision occur. On top of this, not all operations have the same impact on the end result. Thus for some operations, a high expansion factor is more important than for other operations. Finding a good set of expansion factors can be facilitated by iteratively optimizing the set of expansion factors to get an acceptable accuracy, e.g., an accuracy close enough to the accuracy of the first network.

Converting a computational network is not limited to neural networks, although these are an important class of functions that can be well converted in this manner. Neural networks are often insensitive to small inaccuracies introduced throughout the computation. Thus neural networks tend to convert into especially efficient second computational networks using an embodiment.

Encrypted values in an FHE scheme are typically limited to a fixed number of bits. The term real number or real is used herein to indicate a number that needs not be an integer. Although the word real is used, in FHE such numbers are typically represented in a number format comprising multiple digits. Typically, fixed-point precision is used to represent reals, rather than floating-point numbers. For example, in TFHE encrypted values may be numbers restricted to an interval, typically, between 0 (inclusive) and 1 (exclusive). For example, real numbers may be values between 0 and 1 having a fixed precision, say, of 32 bit or 64 bit. Even if values on the torus are within an interval, e.g., are modulo 1, a value on the torus may be represented by values outside the interval, but with the understanding that two values x and y represent the same torus value if they are equal modulo 1.

In embodiments, real numbers are represented in a finite digital real-number representation, typically representing a rational approximation of the real number. Floating point or fixed point representation are typical examples of such real-number representations. A real-valued matrix multiplication may comprise a real-valued matrix multiplication represented by a real-valued matrix and optionally a real-valued vector addition represented by a real-valued vector. In an embodiment, one, or more, or all elements of the real-valued matrix are represented in a finite digital real-number representation. In an embodiment, one, or more, or all elements of the real-valued vector are represented in a finite digital real-number representation. In an embodiment, all elements of both the real-valued matrix and the real-valued vector are represented in a finite digital real-number representation; this is not necessary though and mixed representation matrix and/or vectors are a possibility. The floating point number format is described in, e.g., IEEE 754.

Once a set of expansion factors has been chosen, one can convert a real-valued matrix multiplication with an integer-valued matrix multiplication, a real-valued addition by a real-valued addition but where the real multiplier is possibly multiplied with the expansion factor. The same conversion is done for convolutions. A real-valued convolution with a real-valued kernel composed of real numbers is converted into an integer-valued convolution with an integer-valued kernel composed of integers. The real-valued kernel may be converted by multiplying it with an expansion factor and rounding. The same conversion may also be done for batch normalizations. A batch normalization is typically an affine function, e.g., $y=f *x+b$, where $f$ and $b$ are real-valued constants. The real-valued batch normalization may be converted into another affine function, e.g., $y=f' *x+b'$, where $f'$ is an integer constant, and b' is a real-valued constant. Most of the other operations may be converted to one or more programmable bootstrappings. Some operations can still be performed on encrypted values; for example, operations that only change the order of values, e.g., flatten, concatenation operations, or linear operations such as addition or subtractions of two vectors or the like.

The expansion factors themselves are typically real-valued numbers. The expansion factor may be represented as in fixed precision notation, floating point, etc. A real, including the expansion factor can also be represented as a pair of a numerator and denominator, indicating a rational that approximates the real.

Expansion factors are often larger than 1, but this is not necessary. Typically there is an expansion factor for each operation in the first computational network that only implies integer-valued multiplications and integer or real-valued additions between predetermined values and encrypted values.

The expansion factors may be found by assigning the expansion factor symbolically and propagating a symbolic input through the first computation network. In an advanced embodiment, so-called join operations are addressed, which are particular operations where values are combined that come from different sources, but do not use a programmable bootstrapping, e.g., addition, subtraction, and concatenation operations. A join operation may also be an integer-weighted addition, e.g., integer linear combinations. For example, a join operation receives two or more, vectors of encrypted values from two or more operations. Such join operations can be performed directly on encrypted values provided they are multiplied with the same expansion factor. Thus, join operations impose constraints on expansion factors that we need to solve, to have a second network which is homogenous and gives correct results.

A real-valued matrix operation combines multiplications and additions. The matrix operation may be regarded as having a linear part and an addition part. For example, a matrix operation may be WX+B or Wx+b, wherein W, X, B are matrices and x, b are vectors. Many operations can be regarded as such matrix operations, for example, the real-valued matrix operations may comprise one or more of: convolutions with a real-valued kernel, matrix multiplication with a matrix of real-valued weights, batch normalizations with real-valued scalars. For example, a convolution can be regarded as repeated multiplications between a predetermined vector of kernel weights and a vector of input values of the convolution, the latter being encrypted in the second computational network. If convenient the data can be represented in various types of tables, e.g., 2-dimensional, or bi-dimensional, or higher-dimensional kernels. Input values may likewise be organized in higher dimensional tensors. Such varying organizations of data however are subsumed under matrix operations.

A particularly useful application of conversion is allowing the execution of computation on private data. For example, a computation such as a medical evaluation of an image or other medical data.

Medical data may comprise a medical image. A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

A further aspect is an electronic system or device, e.g., a computer, configured for conversion according to an embodiment.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a system for performing a computation using fully homomorphic encryption (FHE), FIG. 1b schematically shows an example of an embodiment of a system for performing a computation using FHE, FIG. 1c schematically shows an example of an embodiment of a system for performing a computation using FHE, FIG. 1d schematically shows an example of an embodiment of a system for converting a computation for FHE, FIG. 2 schematically shows an example of an embodiment of a converting system, FIG. 3 schematically shows an example of an embodiment of a first computation network, FIG. 4a schematically shows an example of an embodiment of a first computation network, FIG. 4b schematically shows an example of an embodiment of a first computation network, FIG. 5a schematically shows an example of an embodiment of a first computation network, FIG. 5b schematically shows an example of an embodiment of a first computation network, FIG. 6 schematically shows an example of an embodiment of a converting method, FIG. 7a schematically shows examples of a computer readable medium having a writable part comprising a computer program according to an embodiment, FIG. 7b schematically shows a representation of a processor system according to an embodiment.

REFERENCE SIGNS LIST

Figure 1A:
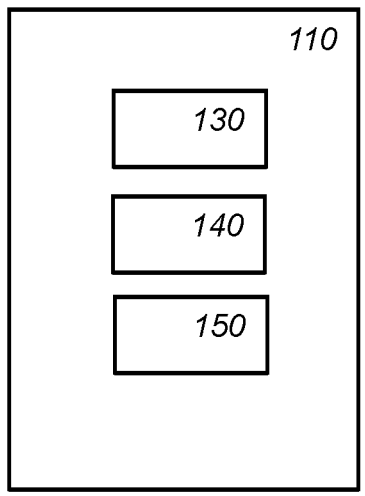

The following list of references and abbreviations is provided for facilitating the interpretation of the drawings and shall not be construed as limiting the claims. The list refers to FIGS. 1a-5b and 7a-7b.
- 1-99 a layer
- 110 an FHE computing system
- 111-113 an FHE computing system
- 114 a converting system
- 130, 134 a processor system
- 140, 144 a storage
- 150, 154 a communication interface
- 160 a data-provider system
- 200 a converting system
- 210 a first computation network
- 220 a second computation network
- 211-214 an operation
- 221-224 an operation
- 230 expansion factor unit
- 231 an optimization unit
- 240 a converting unit
- 250 an accuracy unit
- 251 a sample storage
- 300 a first computation network
- 410 a first computation network
- 411 an input
- 412-414 an operation
- 415 an output
- 420 a first computation network
- 421 a fork operation
- 422 a join operation
- 510 a first computation network
- 511 a fork operation
- 512 a join operation
- 520 a first computation network
- 525 a correction operation
- 1000 a computer readable medium
- 1010 a writable part
- 1020 a computer program
- 1110 integrated circuit(s)
- 1120 a processing unit
- 1122 a memory
- 1124 a dedicated integrated circuit
- 1126 a communication element
- 1130 an interconnect
- 1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

FIG. 1a schematically shows an example of an embodiment of an FHE computing system 110, e.g., a system for performing a computation using fully homomorphic encryption (FHE). For example, the system 110 of FIG. 1a may be used to perform a computation on data, even though said data is received in encrypted form, e.g., from a data-provider.

System 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may store encrypted data items, e.g., received from one or more data-providers or generated as intermediate results or end results, e.g., outputs, of the computation. Typically, most or all data items on which the computation of system 110 is performed are encrypted with a key (or keys) that is not known to system 110—that is system 110 may not be configured to obtain the plain data items corresponding to the encrypted data items, e.g., such as stored in storage 140. The decryption key in plain form is secret for system 110, though the encryption/decryption key may be available in encrypted form. For example, the processor system may be configured to perform a sequence of FHE operations, which may include such arithmetic operations on encrypted values as addition and multiplication, but may also include arithmetic operations on encrypted polynomials.

Performing a computation using FHE operations may be done by stringing a series of FHE operations after one another, some of which may operate on input values, other may operate on intermediate values. Typically, most or all the operations are done on encrypted values, so that the FHE system does not know the confidential values that it is working on.

One source of FHE computations is to start from a regular computation, e.g., a sequence of non-FHE operations and to convert the conventional computation into an FHE computation. A particular suitable source of computations that can be converted are so-called computation networks, also called computational networks. In a computation network, the nodes represent operations and the edges in the network indicate which operations take values from other operations as input.

In an embodiment, a computation network may be represented as a directed, cycle-free graph, in which nodes represent operations and directed edges indicate which operations take input from which previous operations. For example, the computation network may be represented in the form of a text file, e.g., as a sequence of operators. A computation network may also be represented as a connection table, together with information indicating the type of the operators.

Input nodes in the computation network may represent external output, while output nodes may represent output values. This concept of computation network can be expanded while still being amenable to conversion by an embodiment. For example, although in an embodiment, the computation network does not contain conditional jumps, conditional assignment may be allowed, as this can be represented as an FHE operation. More precisely, a conditional assignment may be represented as y=c?a: b, which sets y=a if c is True, or y=b if c is False, and is doable in FHE by replacing the operation by the equivalent operation y=c*(a−b)+b, where c is restricted to an encrypted bit 0 or 1. The computation network might also not contain loops, e.g., may be cycle free, but this is also not necessary as loops having a fixed number of iterations can be accommodated in an FHE network as well, e.g., by unrolling the loop. Even loops with a dynamically determined number of iterations may be converted if there is an upper bound on the number of cycles in the loop; in the latter case the dynamic loop may first be converted to a loop with a fixed number of iterations.

Figure 1B:
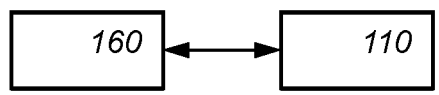
Figure 1C:
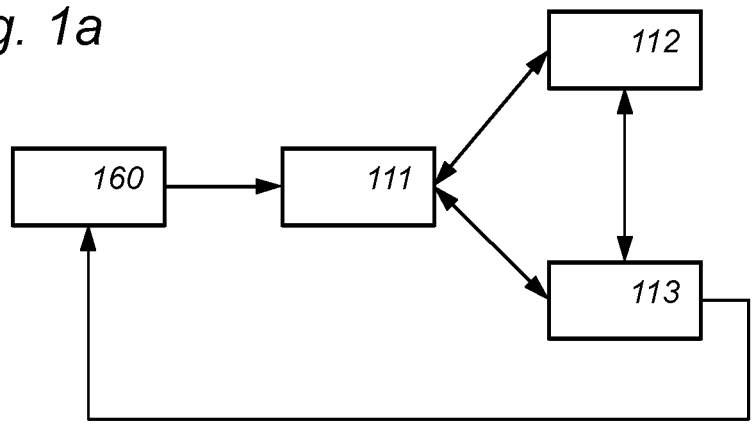
Figure 1D:
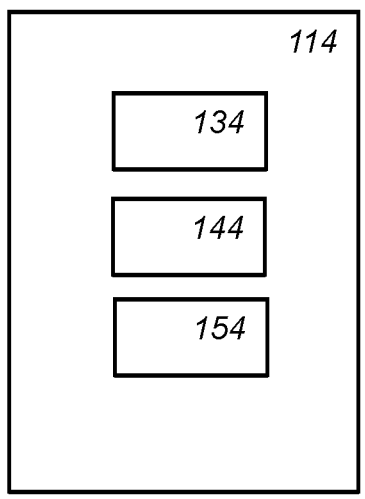

FIG. 1d schematically shows an example of an embodiment of a system 114 for converting a computation for FHE. System 114 may be configured to convert a first computation network of operations arranged to compute a function into a second computation network of FHE operations arranged to compute the same function. Like system 110, system 114 comprises a processor system 134, a storage 144, and a communication interface 154. In fact, system 110 and 114 may be the same system, this is not necessary though. For example, system 114 may receive a representation of a first computation network and convert it into a second computation network for FHE execution. For example, system 114 may receive the first computation network from a third party, e.g., from data-provider system 160 or the like. Alternatively, the first computation network may originate elsewhere, for example, a conventional compiler may receive a high-level description of the desired computation and produce the first computation network, e.g., even multiple first computation networks each for some aspect of the computation that together perform the overall computation. Once converted, the second computation network may be transferred to system 110 for computation. If systems 110 and 114 are the same then the second computation network may be executed on the same system. For example, system 114 may be provided by the same party that provides computation system 110. Alternatively, a user of system 110 may install a system 114 on its own premises, e.g., by downloading appropriate software and using that to convert his computation networks which in turn may be uploaded to system 110 for execution.

System 110 and system 114 may communicate internally, with each other, with other systems, external storage, input devices, output devices, and/or one or more sensors over a computer network. The computer network may be an internet, an intranet, a LAN, a WLAN, etc. The computer network may be the Internet. The system comprises a connection interface which is arranged to communicate within the system or outside the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In system 110 and system 114, the communication interfaces 150 and 154 may be used to send and/or receive digital data. For example, system 110 may be configured to receive encrypted data items from an external computer, e.g., a data-providing computer. For example, system 110 may be configured to transmit computation results to an external computer, typically, in an encrypted format. For example, communication interface 150 may be used for internal communication in system 110, e.g., to distribute the computation of multiple computation entities, e.g., computing devices. For example, system 114 may be configured to receive a first computation network and/or to transmit a converted second computation network.

The execution of systems 110 and/or 114 may be implemented in a processor system, e.g., one or more processor circuits, e.g., microprocessors, examples of which are shown herein. Systems 110 and/or 114 may comprise multiple processors, which may be distributed over different locations. For example, systems 110 and/or 114 may use cloud computing.

Some of the figures herein show functional units that may be functional units of the processor system. For example, a figure may be used as a blueprint of a possible functional organization of the processor system. The processor circuit(s) are not shown separate from the units in most figures. For example, the functional units shown in FIG. 2 (see below) may be wholly or partially implemented in computer instructions that are stored at a system such as systems 110 and/or 114, e.g., in an electronic memory of the system, and are executable by a microprocessor of the system. In hybrid embodiments, functional units are implemented partially in hardware, e.g., as coprocessors, e.g., arithmetic and/or cryptographic coprocessors, and partially in software stored and executed on systems 110 and/or 114.

FIG. 1b schematically shows an example of an embodiment of a system for performing a computation using FHE. FIG. 1b shows the FHE system of FIG. 1a in the context of a data-provider system 160. FHE system 110 is configured for performing a computation using fully homomorphic encryption (FHE) cryptography.

For example, system 110 may be configured to receive encrypted data items from a data-provider 160. At least some data items may be received in encrypted form. Some data items may be received in plain format. The computation is run on the received data items and possibly also on stored data items. Interestingly, the computation may be performed on the encrypted data, without decrypting the data, e.g., without converting encrypted data items to data in a plain format.

System 110 may be configured for an FHE scheme, e.g., for a number of FHE operations, e.g., sometimes referred to as gates. For example, an FHE system may be configured for a so-called NAND-gate. For example, an FHE system may have an addition and a multiplication operation, e.g., in a finite field, or finite ring, or the like. The operations of the FHE scheme are in principle sufficient to perform a wide range of computations, with the exception that the number of consecutive operations may be limited, e.g., if the FHE scheme is a leveled scheme without a bootstrapping operation, or without a bootstrapping operation being employed.

Typically, encrypted data in an FHE scheme and as implemented in an FHE system, involves some measure of noise. For example, encryption of a data item may comprise mapping the data item to a point in a key-dependent lattice, to which some noise is added.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many FHE schemes could be attacked with linear algebra, or other efficient algorithms, e.g., lattice-based algorithms. When a data item is encrypted, noise is added that is chosen so that attacks are hard while FHE operations can still be performed. Most FHE operations will increase the noise that is inherent in an encrypted FHE data item. When many such operations are performed, the noise will reach a level such that correct decryption is no longer possible. At that point, the scheme breaks down. Generally speaking, two approaches have been developed in the art to deal with this phenomenon. The first is the leveled FHE approach. A leveled FHE scheme can perform some limited number of operations, one after the other. The leveled FHE scheme is designed such that the worst-case noise at the end of such a number of operations is below a bound needed for decryption. Another approach are so-called bootstrapping operations. A bootstrapping operation reduces noise in an encrypted data item, by returning a fresh encryption of the same data with less noise. A bootstrapping operation is notably possible if the FHE scheme is capable enough to evaluate homomorphically its decryption algorithm in the encrypted domain-sometimes called a bootstrappable FHE scheme. For example, a bootstrapping operation receives helper data related to the encryption key that allows reducing the noise without decryption of the encrypted data items. Typically, the helper data is an encrypted version of the key used to decrypt the data item. Note that the decryption key may be the same as the encryption key, in case of a symmetric-key based FHE, or may be distinct therefrom, e.g., in case of an asymmetric key FHE scheme. In addition to encryption and decryption keys, an FHE scheme may use other keys, such as a key for homomorphic evaluation. The latter is typically public-key corresponding to a private key which may be stored at the data provider.

Although the bootstrapping operation performs the decryption of an encrypted data item, counterintuitively the decryption is performed in the encrypted domain, so that the homomorphic decryption does not actually reveal anything about the plain data item. The bootstrapping operation then performs the noise reduction-typically by homomorphic rounding. The result is an encrypted data item, with a lower, fixed noise level. Typically, the noise present in the ciphertext resulting from bootstrapping results from the bootstrapping operation.

After the bootstrapping, a new sequence of FHE operations can be performed until the noise level becomes so high, that a new bootstrapping operation is needed.

Determining when a bootstrapping is needed can be done by keeping track how large the noise level will be, e.g., assuming a worst-case scenario. Instead of a worst-case scenario, an average-case may be assumed, although this may increase the risk of a computation result which cannot be decrypted. For example, a computation that is inherently robust against occasional errors, such as a neural network evaluation, may be performed using average-case analysis for the noise propagation.

The noise analysis, e.g., worst-case or average-case analysis, may be done beforehand, but may also be done dynamically. The noise-increase may depend on the particular computation. For example, an FHE scalar multiplication increases noise by an amount that depends on the multiplicand. One approach is to perform a bootstrapping operation often, e.g., after every operation, or after every set number of operations, e.g., every two. Particularly useful are programmable bootstrapping operations which can reduce noise in addition to computing a function. For example, the function can be an encoded as a lookup table, this table being called the test-vector of the programmable bootstrapping.

FHE schemes can be applied in many settings. For example, FHE system 110 may be operated by a cloud provider. The cloud provider may offer computation and storage services to its clients. By employing FHE encryption, data-provider 160, e.g., a client of the cloud provider can send their data in encrypted form. The cloud provider can still perform the required computations, and/or the required storage, but will not be able to know the corresponding to plain data nor the result of the computation. For example, data-provider 160 may use an encryption key of a type corresponding to the particular FHE system used, to encrypt the data items. When computations results are received by data-provider 160 from FHE system 110, a corresponding decryption key may be used to decrypt the encrypted data items. Encryption and decryption keys may be the same—and typically are so.

For example, system 110 may execute a machine-learning model, e.g., image classifiers, e.g., medical models, without having access to the plain data input items. A user of system 110 may supply the input values in encrypted form and receive from system 110 the encrypted output values. The machine learning model may be obtained from system 114. The FHE system 110 may be used to offer the model, say, for use with medical data. This can is typically done with plain model parameters, but with encrypted data, e.g., encrypted input, intermediate and output data. An effect of the system is that a computation is performed, say an image classification, e.g., a medical image classification, without the computer knowing the plain data items. For example, a mammogram may be evaluated for cancer, without the image ever being in the plain at system 110 and without system 110 knowing what the outcome of the cancer evaluation is.

Other applications involve, database services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 110 may be used for protected control of a device. For example, a device, even a large device such as a power plant, may send sensor values to system 110 and receive encrypted control signals in return; the control signals being computed from the sensor signals. An attacker of the system may be able to determine the contents of data going to and from system 110, or even gain access to intermediate data of system 110, but he will not be helped by that as the data is encrypted. Even a full break of system 110 will not reveal the data, as the decryption key is not known to system 110. Computing the control signal may involve such mathematical operation as linear algebra, averages, matrix multiplication, polynomial evaluations, and so on, all of which are possible to execute with FHE operations.

For example, a store, e.g., a collection in a storage, of encrypted data items may be maintained in the FHE system; some of these may be received some may be the result of an FHE computation, e.g., intermediate results. For example, the FHE system may be configured to apply an FHE operation to one, two or more encrypted data items in a store, e.g., a collection of input and/or intermediate and/or output values. The result will be a new encrypted data item that may be stored in the store. The encrypted data store may be stored in a storage of the FHE system. This may be local storage or a distributed storage. In the latter case, it may happen that one or more encrypted data items are represented multiple times in the encrypted data store. Encrypted data items may be sent from one computing device to another, e.g., if their values are needed elsewhere. The encrypted data store may be implemented in various ways, e.g., as a register file, an array, various data structure, and so on.

For example, in an FHE scheme based on the Learning With Errors (LWE) problem, e.g., such as the Torus-FHE (TFHE) mentioned in the background, an encryption key may be a string of n digits $s_i$, a ciphertext may be a tuple $(a_1, \ldots, a_n, b)$ with $b - \Sigma_{j=1}^n s_j \cdot a_j = \mu + e$. In the latter, + and · respectively represents the addition between torus elements and a product between integers and torus elements, $a_i$ are n torus elements, u is the plain data item as a torus element, and e is the noise, e.g., drawn from a probability distribution, e.g., a Gaussian distribution. Conventionally, the secret digits $s_1, \ldots, s_n$ of the secret key s are bits; this is not necessary though. The secret digits $s_j$ could take on more than 2 values, e.g., three values (ternary digits), four values, or even more.

This scheme naturally extends to other mathematical structures, including based on polynomials. The numbers $s_i$, $a_i$, b, u, e may therefore be taken from a different mathematical structure. Not all encrypted data items need to be encrypted under the same key, and in fact re-encryptions with a different key is a possible FHE operation. To convert from one key to another a so-called key-switching procedure may be used, which may use so-called key-switching keys. Key-switching keys provide information on how elements encrypted under a first key can be re-encrypted under a second key, without revealing either key.

The encrypted data items may represent all kinds of data. For example, encrypted data items may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a color pixel may be represented as multiple color levels, e.g., RGB levels, which in turn may be represented by a tuple of encrypted data items. For example, three 256-level colors may be encoded in three encrypted data items. How many encrypted data items are used to represent some type of data depends on the capacity of the FHE scheme. For example, more restrictive FHE schemes may only be capable of encoding one bit per encrypted data item. In that case, one color pixel, may require 24 encrypted data items.

Although without access to the decryption key it may not be possible to say exactly how large the noise is, one can typically bound the noise, e.g., as the initial noise level is known for a fresh encryption and the noise increase for various operations are known. Noise increase may depend on the type of operation, e.g., addition versus multiplication, and on the other parameters if any. For example, an FHE operation may be multiplication with a known, e.g., plain value, e.g., multiplication by 2, multiplication with a known polynomial, and so on. For example, multiplication with a larger value may increase the noise more than multiplication with a smaller value. Exactly how much noise increases given the performed operations can be calculated mathematically, or could be estimated empirically. While some operations may add significant amounts of noise, others may not add noise, e.g., an addition with a plain constant.

A set of FHE operations may be defined for the computation. For example, from a target FHE computation, a network or circuit of operations may be built that together implement the computation. For example, the operations may be Boolean operations. For example, the operations may all be NAND operations. The way the FHE operations are combined, e.g., which operation is applied to which operand in the encrypted data store determines the computation that is being performed. For example, the computation may be represented as a list of FHE operations that are to be performed together with an indication on which FHE encrypted data item they are to be performed.

As operations are performed, the noise associated with the new computed (not-fresh) encrypted data items may grow. This is not a problem so long the noise stays within a limit needed for decryption. If more operations are to be performed, a bootstrapping operation can be performed.

The size of encrypted data items in an FHE scheme can be quite large. Moreover, the more operations an FHE scheme is to perform without a bootstrapping operation the larger the size of an encrypted data item typically will be. Likewise, a higher resistance against attacks may be obtained with larger FHE parameters and in turn with larger encrypted data items. For example, the data items may be mapped to an FHE system featuring larger FHE parameters, so that more noise can be added while still being able to successfully perform operations. Increasing the range of values that a secret key digit can take on, will increase the entropy, and thus contribute to the FHE security.

FIG. 1c schematically shows an example of an embodiment of a system for performing a computation using FHE. Shown in FIG. 1c is the data-provider system 160, and three FHE devices: Devices 111, 112, and 113. Each of devices 111, 112, and 113 are capable of performing FHE operations on encrypted data items. Together the three devices form the FHE system. There may be two or more than three FHE devices cooperating to form an FHE system.

In the case of FIG. 1c, the computation is distributed over multiple FHE devices, in the example shown, three FHE devices. For example, one of the multiple FHE devices may transmit encrypted data items to one or more of the other multiple FHE devices, e.g., received encrypted data items or intermediate encrypted data items, e.g., partial computation results. Likewise, each of the multiple FHE devices may be configured to receive encrypted data items from the other devices.

A prime example of a computation network for which there is a desire to transform it from conventional computation into FHE computation are neural networks. In an embodiment, a system for converting takes a first neural network as input, which is an example of a first computation network, and generates a second neural network as output, which is an example of a second computation network. The second computation network may comprise a representation of FHE operators, their parameters, and so on. The second computation network computes the function represented by the first computation network, or typically, an approximation of the function. Especially, for neural networks, computing an approximation is acceptable.

Evaluating a neural network as a second computational network of FHE operation is useful to improve the privacy of users. Other examples of computation networks include: (i) running a medical test on one's private information, e.g., DNA data without revealing either the private information or the result of the test, (ii) spam detection: one can detect if a mail is a spam without having the key to decrypt it, e.g., without seeing the mail.

An example of the former system may comprise a first device where medical data is obtained, e.g., received from on more sensors. The sensors may include, e.g., a temperature sensor. The sensors may include image sensors. The data is encoded according to an input encoding and encrypted using a secret key. The encrypted data may then be sent to a medical device where a second computational network is applied to the encrypted data. The encrypted output may be a classification of the input, e.g., an image classification. The encrypted result can be sent back to the medical device for decryption and decoding.

An example of the latter system may comprise a first mail device where e-mail is received, the e-mail may then be encrypted according to the FHE scheme, e.g., using a secret key known at the first mail device. The first mail device may first encode the mail to a series of torus points, e.g., using an input encoding, and then encrypt the series to a series of encrypted values, e.g., using an LWE representation. The encrypted series is then sent to a spam-detector device, where a second computational network is installed. The encrypted values may also include other information, e.g., meta data, e.g., origin and/or destination addresses. The second computational network is applied to the series of encrypted values and produces an encrypted result, e.g., a binary spam or no-spam result, or a real-valued number, say, representing a probability that the mail is spam. The second computational network is obtained as a conversion from a first computational network, e.g., trained for spam detection.

The encrypted output value (or values) is then sent from the spam-detector device to the first mail device, where the output is decrypted, e.g., using the secret key, and decoded, e.g., using an output decoding. Based on the result, the first mail device may discard the mail or not. For example, the first mail device may decide to display or not show the mail based on the decrypted output, or decide whether to forward the mail to a second mail device.

Interesting use-cases are machine-learning (ML) algorithms executed on un-trusted platforms, while maintaining user privacy: by using FHE in this case, one can keep user's data or the results thereof private.

Fully homomorphic encryption (FHE) is an encryption scheme where one can perform computations on encrypted data using only public material. The FHE scheme does not require knowing, e.g., a private key of the user, and does not to decrypt ciphertexts. There exist several kinds of FHE schemes, TFHE (for Torus-FHE) schemes are currently an efficient choice. TFHE schemes support an efficient bootstrapping (BS), which allows to reduce the noise in the scheme, and thus, support the homomorphic evaluation of neural networks (NN) as deep as desired. Furthermore, the bootstrapping operation can be combined with any function that needs to be performed on data, thus combining function evaluation and noise reduction. This feature is referred to as programmable bootstrapping (PBS). For example, a programmable bootstrapping can reduce noise and perform, say, an activation function at the same time.

A preferred class of FHE schemes are torus-based schemes, referred to as TFHE schemes. In a torus-based scheme, values may be represented modulo 1. For example, the TFHE scheme may be based on the Learning With Errors (LWE) problem mentioned above. A preferred implementation of a TFHE scheme and programmable bootstrapping is provided in the paper "Programmable Bootstrapping Enables Efficient Homomorphic Inference of Deep Neural Networks", included herein by reference.

TFHE supports some operations directly on the encrypted data without performing bootstrapping. These operations include: modular addition, typically with 1 as the modulus, and multiplication between a (clear) integer and an encrypted value, represented as a torus element. Encrypted values in a torus scheme are mapped onto real-valued numbers modulo 1, e.g., between 0 (inclusive) and 1 (exclusive). Although reference is made to real numbers, these values are typically represented in fixed precision, as, say, a 32 or 64 bit number.

One of the limits of TFHE is that multiplying two torus values is not defined, since the product of a real number by a torus element is not defined. Advantageously, the multiplication by an integer can be done without a programmable bootstrapping. In an embodiment, the second computational network is TFHE-based, which when executed computes a neural network encrypted data. The parameters in the second computational network are allowed to be plain values, but they operate on encrypted values. Encrypted values are values on a torus, e.g., real values modulo one. For example, a value on the torus ($\mu$) may be encrypted as an LWE ciphertext, e.g., by masking the value with a mask (b) that is obtained as a dot-product (b=s·a) of a series of key digits ($s_i$) and a series of masking values ($a_i$) with a noise (e): $b - \Sigma_{j=1}^{n} s_j \cdot a_j = \mu + e$. Conveniently, the torus points are mapped to a discrete ring.

Operations that are performed in the first computational network must be translated into operation for the second computation network. There are several goals to take into account. There is a desire to avoid programmable bootstrapping as they are much more costly than operations that can be directly performed on the encrypted data. Secondly, the resulting second computational network should be sufficiently accurate. For most practical applications, whether it is neural network evaluation, or computing a controlling signal from input sensor values, an exact replication—although possible—is often not required. Allowing some difference between the functions represented by the first and second computation networks allows a much more efficient network, preferably, the accuracy should remain within some bound. What that bound is, will depend on the application.

A difficulty in transforming a first computation network, such as a neural network, to an FHE computation network is that the first computation network may contain multiplications between an encrypted value and a non-integer value. Such operations can be done, but only using a programmable bootstrapping. For example, in a neural network one may encounter such operations in:

convolutions, where a small real-valued matrix called the kernel is multiplied by multiple selected parts of the input, the selected part being shifted through the input.

matrix multiplications, where two matrices are multiplied together; in the NN case, one may contain ciphertexts while the other one may be a constant matrix of real numbers. Matrix multiplication happens for example, in so-called fully connected layers or dense layers, sometimes referred to as Gemm layers (for General matrix multiplication).

Matrix multiplication, e.g., between two two-dimensional matrices or between a two two-dimensional matrix and a vector are an example of a matrix multiplication. A matrix operation may comprise a matrix multiplication and a matrix addition. A matrix multiplication may be more than 2-dimensional, matrices of higher dimension are generally referred to as tensors.

batch normalization, which can be seen as linear functions $f(x)=ax+b$, where a and b are real numbers. A batch normalization may be regarded as a matrix operation in which the matrix is $\alpha I$, where I is the identity matrix. Alternatively, the batch normalization may be assigned an expansion factor wherein the batch normalization is replaced with $f(x)=\text{Round}(\alpha a)x+\alpha b$.

Notably, one important class of neural networks, a convolutional neural network, uses many convolutions and dense layers.

When transforming a first computation network, one strategy may be to replace non-linear functions by corresponding programmable bootstrappings on encrypted values and to replace linear operations by corresponding linear operations on encrypted values. When reference to a single bootstrapping operation is made, actual code may comprise multiple bootstrapping operations, or may use the same bootstrapping more than once.

Unfortunately, this approach cannot directly be used, since the linear operations typically comprise non-integer coefficients, which are not directly supported in FHE operations, e.g., although they could be transformed using a programmable bootstrapping. For example, for a matrix the multiplication typically will contain many non-integer values. There is thus a desire to transform a first computation network matrix operation with real-valued weights into a THE matrix operation with integer-valued weights, so that a bootstrapping operation is avoided. This problem applies to matrix multiplication, convolution, matrix multiplication, batch normalization and more generally, to any a function where the outputs are a linear combination of some of the inputs.

Operations in the first computation network are often not constrained to remain in a particular small interval, but encrypted values in the FHE operations are restricted to be on the torus, and thus modulo a modulus, typically, modulo 1. One solution to this is to scale all values in the first computation network to values so that they are sufficiently small and are between 0 and 1 and stay between 0 and 1. If values increase too much, they can occasionally be scaled to smaller values. Nonlinear operations can be adapted to expected scaled values rather than the original values. Interestingly, a matrix multiplication, being linear, works on a scaled value as well as on the unscaled value. A matrix addition can be scaled in proportion to the scaled variables.

Encoding values into encrypted values that are between 0 and 1, is important. Although more optimal and less optimal encodings can be devised, one can generally achieve a working encoding by a straightforward scaling and shifting so that all values lie in a sufficiently small sub-interval between 0 and 1. Possibly with an occasional down scaling if values become too big. Note that scaling a value down may be done with a programmable bootstrapping.

Figure 2:
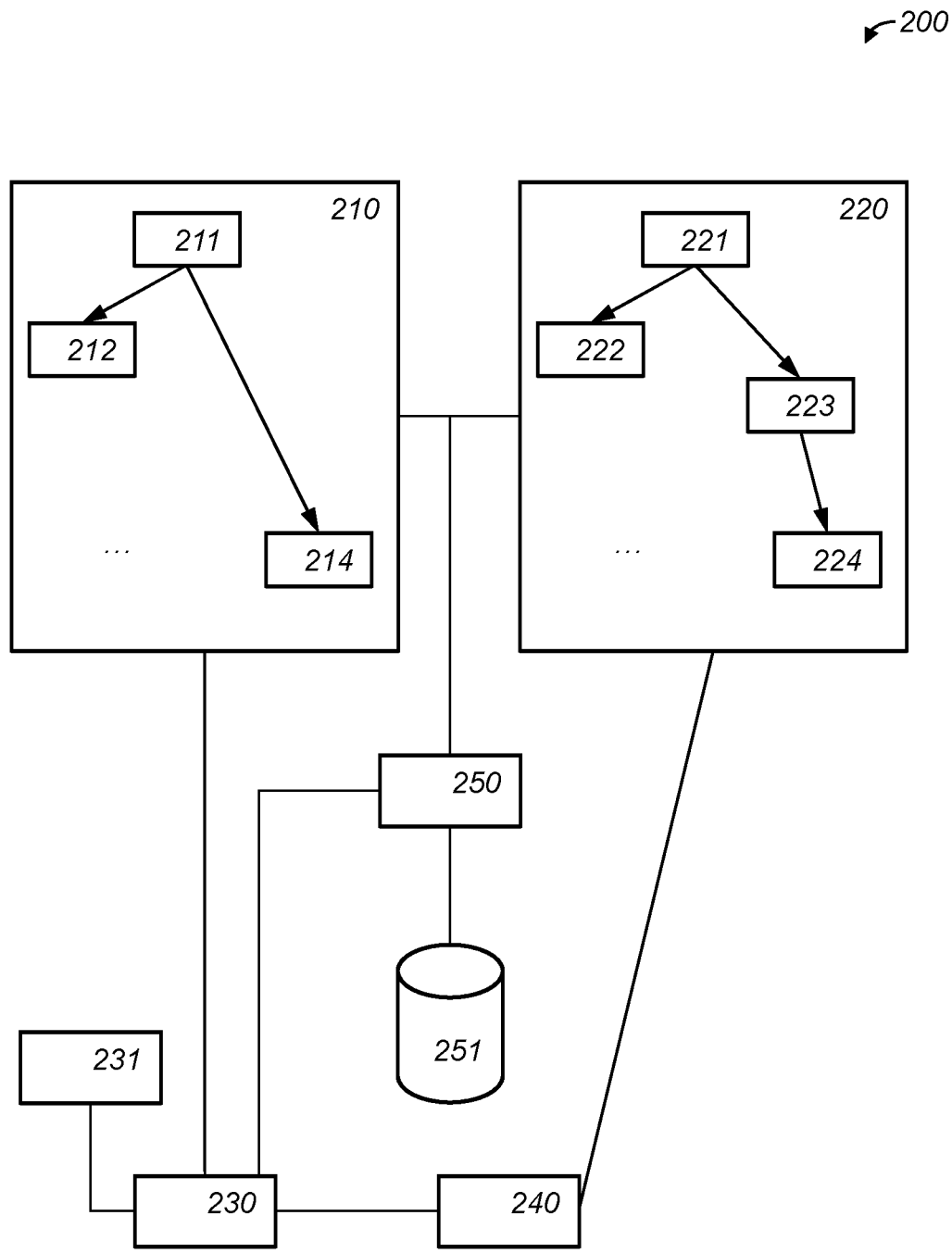

FIG. 2 schematically shows an example of an embodiment of a converting system 200. System 200 is configured to convert a first computation network of operations arranged to compute a function into a second computation network of FHE operations arranged to compute the same function. An important class of networks are neural networks, but the computational networks may also represent other functions. FIG. 2 schematically shows a first computation network 210, of which operations 211, 212 and 214 are shown. Typically, first computation network 210 will comprise more than 3 operations, e.g., more than 10, more than 100, etc.

First computation network 210 comprises a plurality of real-valued matrix operations that comprise a real-valued matrix multiplication and at least a plurality of further operations. For example, a real-valued matrix multiplication may be a matrix multiplication, e.g., $y=W \cdot x$, or $y=W \cdot x+b$, etc. In this example on a vector x. The matrix multiplication may also be with another matrix, e.g., $y=WX+B$. A matrix multiplication may comprise a multiplication between two matrices. A matrix operation may also comprise a matrix addition. In addition to the matrix operations, first computation network 210 comprises a plurality of further operations. A further operation receives as input a result of at least one of the plurality of real-valued matrix operations. There may be more operations, e.g., operations that receive input values from further operations, operations that combine values from different sources, and so on. An example, of a further operation is an activation function, e.g., a sigmoid function, e.g., a function of the form $z=\text{Activation}(y)$, where y may be the result of the above matrix multiplication.

Figure 3:
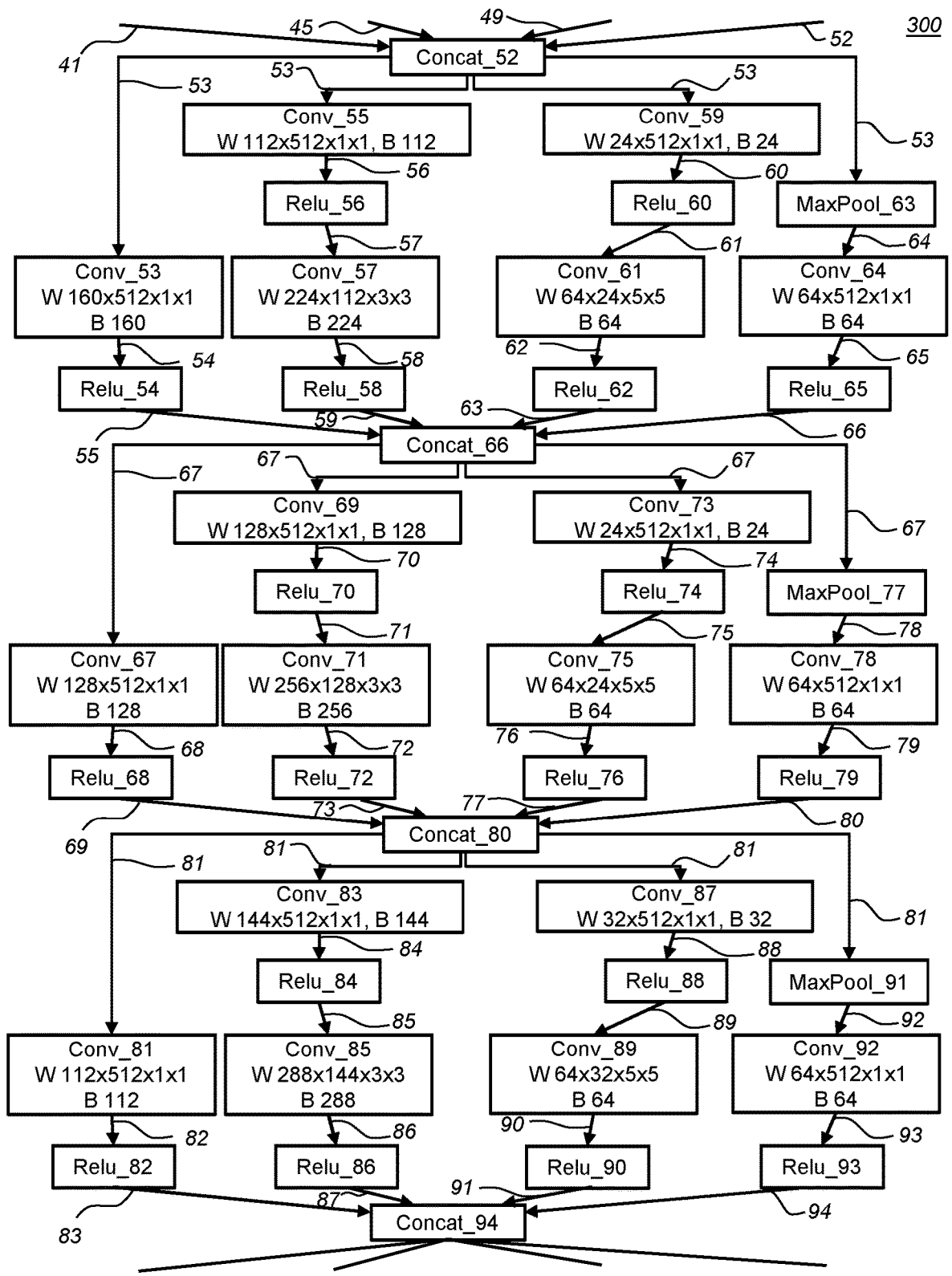

The first computation networks on which embodiments may operate, can be very large and complicated deep neural network. FIG. 3 schematically shows an example of an embodiment of a first computation network 300. First computation network 300 is an example of a neural network which was successfully transformed into a second computation network by an embodiment.

FIG. 3 is a fragment of a network called GoogLeNet or Inception v1, the winner of ILSVRC 2014. Inception is a deep convolutional neural network architecture for object detection and image classification. More details of that network are available in the paper "Going deeper with convolutions" (included herein by reference) and on the corresponding page of inception_v1 on the open neural network exchange (onnx) currently hosted on GitHub (included herein by reference).

Shown in FIG. 3 are multiple operations, and layers between them. Layers are denoted with a reference sign between 1 and 99. For example, the top of the FIG. 3 shows a concatenation operation. Concatenation operations are indicated as 'Concat_xx', where xx indicates the particular concatenation operation. The output of the concatenation operation is input to several other operations. The values that are output of one operation, and input to a next operation, are together referred to as a layer. In this case, the concatenation operation Concat_52 provides values for layer 53. The concatenation operation can be directly transformed to an FHE operation as it only changes the order of values, which can be done on plain as well as on encrypted values. A concatenation operation is an example of so-called join operation as it combines values from different operations. A join operation may require additional care as will be discussed below.

Also shown in FIG. 3 are convolution operations; indicated with 'Conv_xx'. A convolution is an example of a matrix operation. The real-valued matrix operations comprise one or more convolutions with a real-valued kernel. They can be replaced by matrix operations, operating on encrypted values; however care must be taken that the real numbers in the kernel of the convolution must be replaced with integers.

Also shown in FIG. 3 are ReLU operations. A ReLU is an example of a non-linear operation, often a further operation, the ReLU can also take input say from the concatenation operation. In the conversion a ReLU, being a non-linear operation, will be replaced with a programmable bootstrapping.

Also shown in FIG. 3 is a pool operation, in this case a MaxPool. Pooling operations are a type of discretization process, in which an input set of values, e.g., an image, hidden-layer output matrix, etc., is down-sampled thus reducing its dimensionality. In the case of MaxPool, subsets of the values are replaced with their maximum. A MaxPool operation may be implemented by using a bootstrapping operation that takes the maximum of two values, and repeatedly applying it to obtain the maximum of the subsets.

Note that a MaxPool can be implemented using a ReLU, e.g., a MaxPool of two variables a and b, can be implemented as a+ReLU (b-a). A MaxPool over more than two values can be implemented as multiple MaxPools, each one being over two values.

There are other examples of Pooling operations in particular, AveragePool, in which subsets of the values are replaced with their average. An AveragePool may be implemented as summation, which can be done directly on the encrypted values and a division, which may be implemented as a programmable bootstrapping.

Other operations that may occur in a computation network such as a neural network include Flatten, Transpose, and Reshape operations. These are operations which move values around, and are readily transformed to work on encrypted values.

Dropout is an operation used in neural network training, but which is typically replaced with the identity during inferences.

An Add operation stands for additions of layers; it is a linear operation, but is typically a join operation, so that some care is needed, as discussed herein.

Not shown in FIG. 3, but which can also be used are, inter alia, Matrix Multiplication with a matrix of real-valued weights, and Batch Normalizations with real-valued scalars are also operations that may occur. A matrix operation is indicated with Gemm_xx.

Further examples of activation functions include: sigmoid function, softmax function, softplus function, softsign function, tanh function, seLU function, eLU function, exponential function, LeakyReLU layer, PRELU layer, ThresholdedReLU layer Returning to FIG. 2. The first computation network, e.g., a neural network such as shown in FIG. 3 has been provided to system 200 and successfully converted to a second computation network, including removing real-valued multiplications. For example, a file comprising the type of operations, their parameters, e.g., weights, and the connections in the network may be provided in a digital format. For example, system 200 may receive the first computation format from an external source outside of system 200. For example, system 200 may obtain the computation network as the output of a local compiler or of a neural network training unit, either of which may be installed on system 200.

To convert the first computation network, the matrix operations are transformed into corresponding operations that can be performed on TFHE encrypted values. System 200 comprises an expansion factor unit 230. Expansion factor unit 230 is configured for determining a set of expansion factors ($a_i$). Each of the matrix operations correspond to an expansion factor. The idea is to convert a real-valued matrix (W), e.g., as corresponding to a matrix multiplication to an integer-valued matrix by scaling the real-valued matrices with their corresponding expansion factor and rounding. For example, a matrix W may be replaced with a matrix W'=round(aW), where all the entries are rounded individually. Rounding will typically be done to the nearest integer, but one could round down or round up instead as well.

This operation has several advantages. Foremost, multiplication with W' can be done directly on encrypted values, since integer-valued multiplication is supported even if real-valued multiplication is not. Thus no programmable bootstrapping is needed to support this operation, which is much more efficient. Second, since an expansion factor $\alpha$ can be chosen arbitrarily, the loss of accuracy due to the replacement of W with W can be controlled. A high value of the expansion factor $\alpha$ makes for a more accurate transformation. Typically the expansion factor will be at least 1, but for a matrix that happens to have large entries, and which has comparatively a low impact on the overall function a value of less than 1 may also be used.

Once the matrices in the matrix operations are replaced with their scaled and rounded functions, the remaining operations can be adapted to the new matrices.

For example, the matrix operation Wx+B, may be replaced to W'x+(aB). Note that there is no reason to round the vector B, since addition of encrypted values and plain real-valued numbers is supported. A further operation that receives input from a matrix operation, will now receive values that are approximately a times as large. This can be accounted for by replacing a function A(x) with a function A(x/a). As the function A will be implemented with a programmable bootstrapping operation, there would no problem to add an additional division operation. In short, after adjusting the matrix operation so that the matrix consists only of integers, the other operations, and in particular the further operations, are adjusted to account for the magnitude change of the matrices. At this point the second computational network can be created from the first computation network: all matrix operations are replaced by their integer-matrix variants. A non-linear operation may be replaced with one or more programmable bootstrapping operations.

In other words, one can multiply the multiplication part of a matrix operation, with an expansion factor (followed by a rounding), but this will cause a modification of computed values throughout the part of the computation network following the modified matrix operation. If the matrix operation also has an addition part, this latter additive term may be multiplied with the same expansion factor, although here no rounding is needed. The matrix operation now produces outputs that are larger by a factor similar to the expansion factor. A further operation that takes input of a modified matrix operation can be adjusted to receive as input a scaled result of a scaled matrix operation. If a second matrix operation were to follow a modified first matrix operation, it can be adjusted by scaling the second matrix down with the expansion factor of the first matrix operation followed by an expansion factor of the second matrix operation itself.

The second computation network can now be constructed by implementing further operations, e.g., non-linear operations as one or more programmable bootstrappings. The matrix operations can be copied into the second computation network since real-valued additions and integer multiplications are supported in the FHE without a programmable bootstrapping.

System 200 comprises a converting unit 240. For example, converting unit 240 may receive expansion factors from the expansion factor unit 230. The converting unit 240 may be configured to perform the conversions from conventional operations in the first computation network into an FHE operations in the second computational network. FIG. 2 show the second computational network 220 comprising FHE operations 221-224. In an embodiment, there is a correspondence between the first and second computational network, wherein matrix operations in the first computational network correspond to a matrix operation on encrypted values in the second computational network, and where further operations are mapped to a set of one or more programmable bootstrappings. In the conversion, most of the operators in the first computation network correspond to one operator in the second network. However, sometimes it is better to introduce an additional operator. This is shown in second network 220, which schematically has the additional operator 223. The first and second networks 210 and 220 typically have many more operators in practice, e.g., more than 10, more than 20, etc.

Note that in the above procedure, there are many choices for the expansion factors. A higher expansion factor ensures a higher fidelity of the corresponding matrix operation in the second computational network compared to the matrix operation in the first computation network. However, a higher expansion factor also has a downside. Encrypted values in the FHE scheme represent value between 0 and 1, which means that values in the first computation network are represented by a scaled value in the second computation network, where the scaled value fits between 0 and 1. In fact most FHE operations have a stricter requirement, e.g., requiring that the value fit between 0 and some upper bound, which may be ½ or even ¼. Although this can be resolved by scaling all values down sufficiently so that everything fits in the required intervals, this in itself has the result of lowering the accuracy of how well the second network can approximate the first computation network. Higher expansion factors worsen this problem, by increasing the size of values, and thus increase the scaling down required to fit values in the prescribed intervals. Thus expansion factors both increase accuracy in the second network, but indirectly through increased demands on the encoding also decrease accuracy. To make this even more complicated, the impact operations in the network have on the final result varies. In other words, accuracy in the second network improves by applying larger expansion factors for some matrix operations, and smaller expansion factors for other matrix operations.

System 200 comprises an accuracy unit 250 with access to a sample storage 251, e.g., connected to it, or comprising it. Accuracy unit 250 is configured to determine an accuracy measure for the second computation network indicating the accuracy of the second computation network. There are different ways to go about an accuracy measure.

In a first approach, the first computational network and the second computation network are both evaluated for the same multiple sample values, often referred to as a data set. The second computational network is then rated on how close second computational network outputs are to outputs of the first computational network. For example, the accuracy measure can be an average squared difference, or the like—there are many measures of accuracy that may be used. The input values may be selected randomly, but a more realistic result is achieved by testing the first and second computational network using representative inputs. For example, in an embodiment, sample storage 251 comprises multiple input values. Preferably, the sample input values are representative of the type of inputs that can be expected during operational use of the second computation network.

For example, if the first computation network is a neural network expecting an image as input, say, a medical image, then the accuracy is preferably evaluated on similar medical images.

A second approach is to evaluate only the second network. In this case, a set of input values and corresponding expected output values may be provided to system 200, e.g., from data provider 160. These outputs may be the same as the outputs that the first computational network would provide; however this sample set may also be obtained independent of the first computational network. For example, the outputs may be reference values, or gold truth values. This approach has the advantage that the second network is evaluated on how close it is to the function that the first network is supposed to evaluated, and is not penalized for failing to faithfully reproduce the idiosyncrasies of the first computational network. For example, the second network may be evaluated on samples used for training or validating the first computational network.

Interestingly, to evaluate the second computational network, it is not necessary to actually perform the operations on encrypted values. Instead, the second computation network can be simulated, by having it operate on plain values, simulating the same noise increase and the like of the second network but on plain values. For example, a matrix operation in the second computation network could be simulated by performing the same matrix operation but on a plain value that is scaled in the same manner. For example, a programmable bootstrapping operation in the second computational network can be evaluated by using the test vector of the programmable bootstrapping as a look-up table that maps plain values to plain values. Clearly, this approach is not suitable for operational use, but it provides the same or similar accuracy values at significantly lower computational costs.

Having access to an accuracy value, it becomes possible to improve the second computation network by varying the expansion factors. For example, system 200 may comprise an optimization unit 231 configured to iteratively optimize the set of expansion factors ($a_i$) to increase the accuracy measure. The accuracy measure may take into account the accuracy loss due to large expansion factors. Alternatively, the optimization may optimize the accuracy measure while also optimizing other goals such as execution speed of the second computational network. Various optimization schemes may be used. For example, the optimization may use hill climbing, simulated annealing, genetic programming and the like. For example, optimizing the expansion factors ($a_i$) may comprise one or more of: exhaustive search, logarithmic search, a probabilistic method, gradient search.

Below various details, alternatives and embodiments are discussed in further detail. First consider the simple fragment of a neural network. Suppose in the first computation network one has y=W·x+B followed by z=Activation(y), where W is a constant real-valued matrix called a weight matrix, and B is a constant real-valued matrix called a bias matrix. To do the equivalent computation over the encrypted data, the values on which the first computation network operates are scaled down to fit in the interval 0-1. The appropriate amount of scaling can be obtained from the first computation network, e.g., by evaluating it on multiple inputs. The real-valued matrix W is to be transformed into an integer-valued matrix, e.g., a matrix of integers. Once this is done, the matrix multiplication is defined, in a matrix based FHE, such as THE. Set an expansion factor α, which may be a real number and replace the computation by y'=W'·x+B' and z'=Activation'(y'), where:

W' is an integer-valued constant matrix, defined by W'=Round(a*W), where Round( ) is the rounding function to the nearest integer, B' is a real-valued constant matrix, defined by B'=a*B Activation' is the function Activation'(x)=Activation(x/a)

x comes already encoded in the torus, and y' and z' are encoded on the torus.

This is a valid modification since:

now, the weight matrix W' is made only of integers, so is compatible with TFHE operations, computations are approximately correct, since y'≈ay and z'≈z, as soon as a is big enough. Note that y' is about a times larger than y was. By scaling the initial input small enough the intermediate values will also be smaller. Activation functions may restore a value to its original range; if this is too large, an additional scaling factor may be incorporated in the activation function, e.g., replacing a function A( ) by A( )/d+s.

Values in the modified fragment approximately stand in fixed relation to values in the original network. A pointed out above, the larger the expansion factor α, the more accurate the new computation is with respect to the original. However, a large expansion value α means the computed values are in a larger range, which can lead to precision issues when doing the FHE computations on the lowest values of the range. So, the goal is to find the smallest a such that the accuracy of the modified neural network is close enough to the original accuracy. Searching for a can be done with a various types of search algorithms.

For neural networks this works particularly well, since they inherently support noise; they can absorb a certain amount of modification and rounding in their layers, without having a big impact on the functioning. This reduces the impact of using rounding operations on matrices. Activation functions can be replaced by PBS operators in the second computation network. The computational cost of supporting the original activation function or the adjusted activation function is the same. At the end, the modified neural network (i) is completely compatible with TFHE, and (ii) has an accuracy which is close enough to the accuracy of the original NN.

In particular, real-valued weights are allowed in the first computational network. An alternative solution would be to use a different training algorithm that forces entries of the weight matrix to be integers. Yet another option would be, given a first computation network, to train an intermediate computation network that only uses integer-valued weights, and then to convert the intermediate network. Both these approaches are undesirable. It is preferable that developers of first computational networks have the freedom to use training schemes that suit them best, while retraining a network is computationally expensive. Another advantage of the conversion system is that it supports complicated, state-of-the-art neural networks; e.g., wherein a multi-sum is not always followed by an activation, but say by a join operation. A multi-sum is a general term referring to Gemm, matrix multiplication, Conv or BatchNorm; that is any operation y=Op(x), where Op is defined for elements $y_i$ of y as $y_i=\Sigma_j c_{i,j} x_j$, where $c_{i,j}$ are constant multipliers. The constant multipliers may be real-valued in the first computation network, and replaced by integer-valued multipliers in the second computation network.

Figures 4A, 4B:
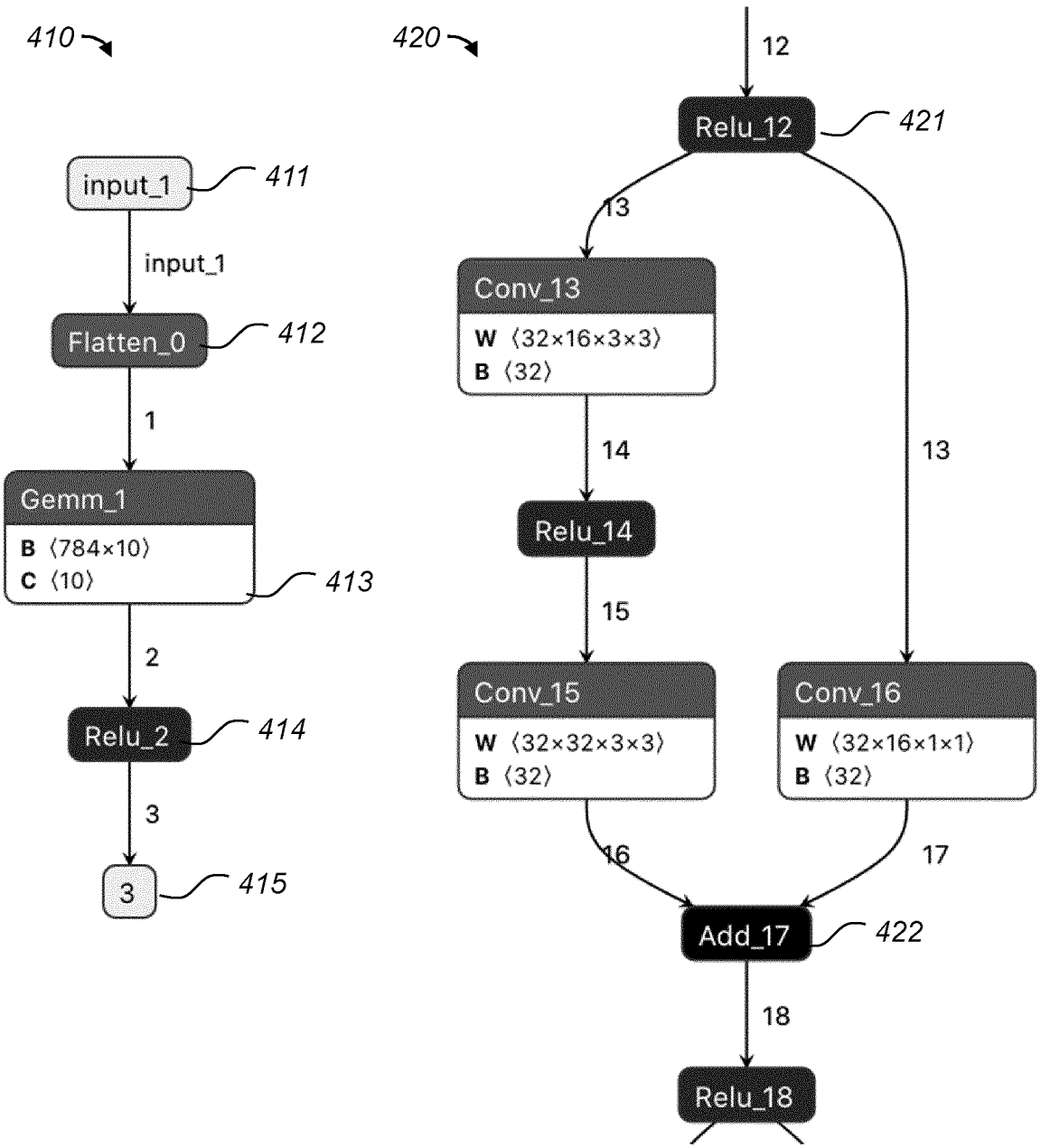

FIG. 4a schematically shows an example of an embodiment of a first computation network 410. First computation network 410 may also be considered as a fragment of a larger first computational network. Shown in FIG. 4a is an input 411, operations 412-414 and an output 415. At the input 411 and output 415 input values are received or produced, these will be encrypted values in the transformed second computational network. In this example, operation 412 is a flatten operation, operation 413 is a general matrix multiplication and operation 414 is an activation function, in this case a ReLU operation. Also shown in FIG. 4a are 3 layers: layers 1, 2, and 3.

The relationship between values in the layers of the first computational network and of the second computational network can be expressed as a layer factor. The layer factor is a multiplicative ratio between a value in the layer in the first computation network and the corresponding value in the corresponding layer in the second computation network.

A layer may be further specified as a tensor of so-called neurons: tensors are arrays of any dimension, not necessarily restricted to 1 or 2 dimension, e.g., three or more dimensions. For example, one could have a layer which is a tensor T of shape (2, 3, 5), which means it corresponds to 30=2× 3×5 neurons. For example, T[i, j, k] for i in {0,1}, j in {0, 1, 2} and k in {0, 1, 2, 3, 4}. Using a multi-dimensional representation is often beneficial to better understand the operating of the neural network operations and/or their correspondence to real-live objects, e.g., images. Nevertheless, the tensor operations boil down to matrix operations and can be regarded as such. For example, a tensor defined in the first computation network may have real-valued elements, which may be converted to integer-valued elements according to an embodiment.

The matrix operations are associated with an expansion factor $\alpha_i$, which is typically a real-valued number. In a matrix operation, the expansion factors cause the input layer factor to be multiplied by $a_i$ to have the output layer factor. Typically the values of the neurons of a given layer have the same expansion factor and thus the same layer factor. Note that, strictly speaking, because of the rounding, the input layer factor is not exactly multiplied by $a_i$ to have the output layer factor, as a rounding operation will slightly distort the relationship. This aberration is in general small enough to ignore, however.

In layers 1 and 3 the layer factor is 1. For layer 1 this is the case, since a flatten operation does not change the magnitude of the values. For factor 3 this is the case since the output of the activation function is not changed, i.e. has an output factor of 1. Layer 2 is approximately multiplied by $a_0$ in the modified network, because of the $a_0$ expansion factor of the Gemm_1 layer. The activation ReLU is replaced by Relu(x/$a_0$), to accommodate the layer's expansion factor. Note that Relu(x/$a_0$) will be done using a programmable bootstrapping in the second computational network.

Fork and Join Layers

A computation network can have a complex topology. To illustrate this, consider neural networks. A fork layer denotes a layer which is used as a source for at least two next layers, and thus operations, while a join layer is a layer which uses at least two previous layers, values produced by at least two previous operations, or more. FIG. 4b schematically shows an example of an embodiment of a first computation network 420, having fork and join layers. There, layer 13 is a fork as it is used in layers 14 and 17, while layer 18 is a join as it uses both layers 16 and 17 as sources. Fork and join layers are important for deep networks such as Resnet, VGG, and MobileNet, etc.

Typically, join operations, where two or more layers are combined are addition, subtraction, or concatenation, etc. Addition, subtraction, or concatenation can be performed directly on encrypted values, without a PBS.

When two or more layers combine in a join layer, their layer factors are preferably be equal or substantially equal. If not, the result will not correspond to something which can be managed by the next operations, and accuracy will decrease significantly. All layers in the second computation network are preferably homogenous, that is, having a single expansion factor per layer; note that the expansion factor of different layers may be different or equal. A join operation is said to be homogenous if all its input layers have the same layer factor. Thus, when the first computation network comprises forks and joins, solving expansion factors is more complicated. To have equal layer factors in join operation, one could impose that the operations from which the layers originate have equal expansion factors. One could also equalize layer factors by adding an additional equalizing operation in the second network.

Interestingly, one can propagate the expansion factors in a first computation network, even if it has a complex topology, and obtain the constraints that they need to satisfy, in particular which expansion factors need to be equal. For example, a conversion system may be configured to analyze: for all operations of the neural network/function where there is a multiplication with real numbers, assign an expansion factor $\alpha_i$, and determine how the expansion factors propagate through the first computation network. Introduce a constraint when expansion factors arrive in the same join layer, e.g., that the corresponding expansion factors must be equal or made equal by an additional equalizing operation.

solve: solve the system of equations. For example, reduce the dimensionality of the problem by reducing the number of expansion factors, some of them being made equal by the solve step. At the end of the solve step, the network is homogeneous.

find: find the smallest variables $\{a_i\}$ which gives a sufficiently good accuracy; this can be done with exhaustive search when there are not too many $a_i$'s or other gradient-based method or fast-converging methods when there are a lot of parameters;

replace: once the a's are known, replace weights by their corresponding integer weights, modify bias and compensate the computation in the next activation or function which is replaced by a programmable bootstrapping.

To track the propagation of an expansion factor, one can compute the layer factors. For example, this may use the following rules:

the starting layer or input layer has a factor of 1 the factor after a real-valued operation is the one before the operation multiplied by the $a_i$ the factor after an activation can be 1; in an advanced implementation the factor after an activation can also have an expansion factor itself. In an optimization, the latter expansion factor can directly be set to an integer power of some product of existing $a_i$'s in the solve part. An advantage is that it reduces the number of needed additional-layer inserted for conversions.

the input factors of join layers are preferably the same; then, the output of these join layers is the input factor of their sources for other operations, like Transpose, Flatten, Reshape, the output factor is the input factor for pool operations, the output factor is the input factor Returning to FIG. 4b, consider the fork layer 13, and the corresponding fork operation 421, and the join layer 18 and the corresponding join operation 422. In FIG. 4b, expansion factors are introduced by the operations Conv_13, Conv_15 and Conv_16, say factors $\alpha_0$, $\alpha_1$, and $\alpha_2$ respectively. The Relu_14 operation is modified to accept an input that is scaled with a factor do, but will produce an unmodified output. That is the layer's expansion factor after Relu_14 is 1.

One can see that layer 16 has a layer factor with factor @1 while layer 17 comes with layer factor $\alpha_2$. The join operation 422, in this case an add operation, requires equal layer factors, so that join operation 422 introduces the constraint that $\alpha_1 = \alpha_2$. As a result, one would not consider them independent anymore, but equal.

This method is preferable as it is easy to do. The disadvantage of resolving join layers in this way is that it removes a degree of liberty in the expansion factors $\alpha_i$. Such a reduction in liberty may cause the optimization to find larger values for the expansion factors, or find a worse accuracy than is possible.

Other choices are possible, as will be further expanded upon below. For example, one may introduce an expansion factor at the output of Relu_14. In that case, one may have Relu_14'(x)=Relu_14(x)*$(\alpha_2/\alpha_1)$ so that join operation 422 is homogenous, with an expansion factor $\alpha_2$. In this way, $\alpha_1$ is preserved for optimization, and can be chosen independent from $\alpha_2$. Showing also the adjustment for the expansion factor the ReLU function in the second computational network may become Relu_14'(x)=Relu_14 $(x/\alpha_0)$*$(\alpha_2/\alpha_1)$, compared to the original ReLU in the first computation network. Introducing an expansion factor different from 1 at the output of a further function, e.g., a function implemented as a PBS is not necessary, but can further improve the second computational network.

Figure 5A:
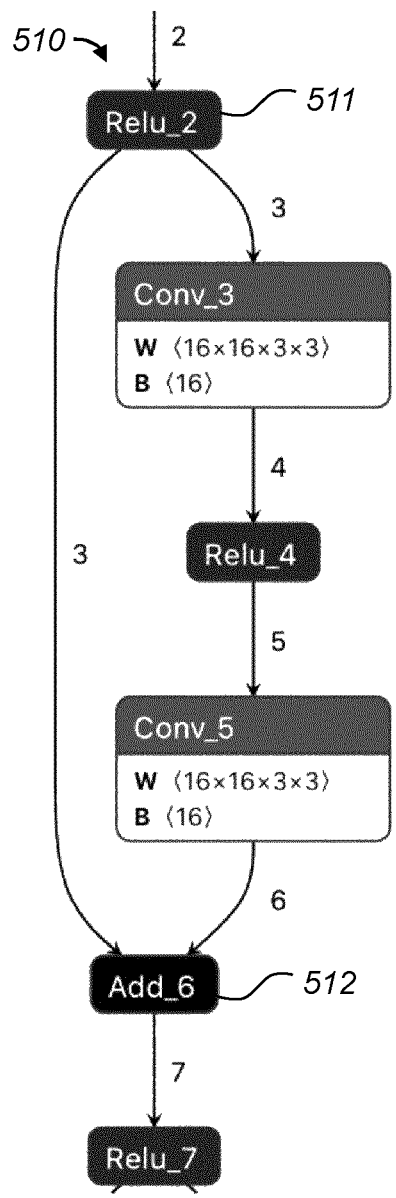

FIG. 5a schematically shows an example of an embodiment of a first computation network 510. First computation network 510 comprises a fork layer 3 with fork operation 511, and a join layer 7 with a join operation 512. If one were to impose the condition that the layer factors arriving at operation 512 were equal, then this could lead to the condition that both layer factors for layers 3 and 6 are 1. Layer 3 will have no expansion factor, or said-differently an expansion factor of 1, while layer 6 will have as layer factor the expansion factor of Conv_5. This in turn would lead to no freedom for the conversion of the conv_5 operation. That in turn may lead to poor accuracy, especially if conv_5 happens to be an important operation. There are various ways to avoid this difficulty.

Figure 5B:
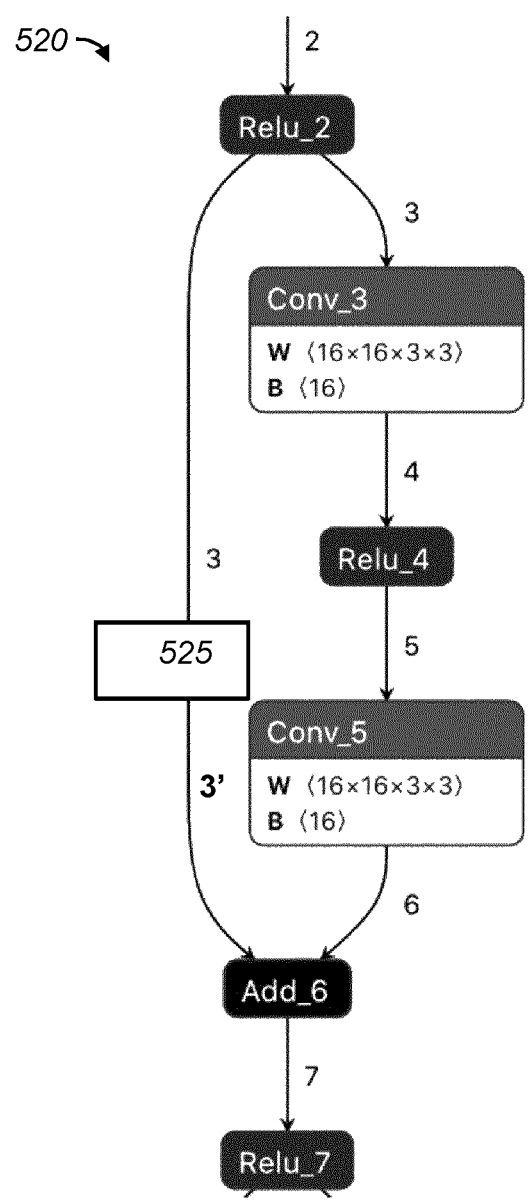

FIG. 5b schematically shows an example of an embodiment of a first computation network 520, that has been partially converted by introducing a correcting operation 525. FIG. 5b the other parts shown have a corresponding part in the first computation network of the FIG. 5a. To further convert network 520, the matrix operations Conv_3 and Conv_5 may be replaced with corresponding matrix operations, but with their matrices converted to integers according to an embodiment. The non-linear operations Relu_2 and Relu_4 may be replaced with PBS versions. The Add_6 operation, which is also linear, can be replaced with a corresponding addition but over encrypted values. Like in FIG. 5a, there is the condition that the input layers of operation Add_6 are homogenous. A difference between FIGS. 5a and 5b is the introduction of a correction operation 525. Operation 525 is a correcting operation which is inserted in the computation network to help make the second computation network homogenous, in this case join operation Add_6, without having to lose too much degree of freedom.

The correction operation 525 introduces an additional expansion factor for the values, e.g., a function $\alpha \cdot x$. Taking the constraint into account imposed by the join operation, here, Add_6, the operation 525 would be the function $f(x)=\alpha_1*x$, such that both layers 3 and 6 have the expansion factor $\alpha_1$. Inserting a scaling operation between two consecutive operations introduces an additional factor which may be optimized. The inserted correction operation splits a layer, in this case layer 3 in 3 and 3'. For example, the system may be configured to introduce a correction operation such as operation 525 between a PBS and a join operation, if the join operation forces an expansion factor in a matrix operation to be 1.

There are two choices for operation 525. The first choice may be that operation 525 may be an integer multiplication. This has the advantage an expensive PBS is avoided, but has the disadvantage that the introduced factor, e.g., $\alpha$, is limited to be an integer. This in turn will typically mean that the expansion factor $\alpha_1$ will be taken larger than it needs to be (to effectively approximate the corresponding matrix operation) such that $\alpha_1$ is an integer, in this case operation Conv_5. Larger expansion factors can on their own increase noise, e.g., by causing values to be coded to smaller intervals. Alternatively, larger parameters can be supported, but at an increased cost, e.g., by increasing the number of bits used to represent real numbers in the FHE scheme.

The second choice may be that operation 525 may be directly implemented by a PBS, corresponding to $f(x)=\alpha*x$. This has the advantage of not constraining the choice of $\alpha_1$ to be an integer, at the price of a slower execution, since a PBS is typically significantly slower than a multiplication by an integer.

For example, in an embodiment, one or more correcting operations are inserted in the second computational network, that scale their input with a correcting factor. The correcting operation may be a programmable bootstrapping, and the correcting factor is a real number, or the correcting operation may be an integer multiplication, and the correcting factor is an integer.

Note that, in general one can transition from a layer X with a factor $\alpha_0$ to a layer X' with factor $\alpha_1$, by inserting a PBS for $f(x)=\alpha_1/\alpha_0*x$. This can also be useful, but when possible, it is better to avoid this solution.

One way to obtain the expansion factors and the optionally inserted correction operations, is to symbolically associate an expansion factor to each matrix operation in the first computation network, then propagating the layer factors through the first computation network and deriving conditions on the expansion factors from the operations in the first computation network applied to the output of a converting operation, such that the network is homogeneous. A solving step may be involved here. For example, the conditions may be analyzed and the dimensionality of the expansion factors may be reduced, e.g., by imposing an equality condition between two or more expansion factors. For example, it may be verified that the conditions are solvable at all, and if not to insert additional operations.

For example, the set of expansion factors $(\alpha_i)$ may be iteratively optimized subject to the conditions, e.g., subject to conditions that join operations are homogenous. The expansion factors may be optimized for accuracy. The optimization may jointly minimize the magnitude of the expansion factors. For example, the expansion factors may be minimized subject to a minimal accuracy level being reached. For example, one may optimize a weighted sum of an accuracy term and an expansion factor weight term.

For example, in an embodiment, a first optimization phase finds an optimized set of expansion factors without introducing correction operations. If the accuracy is not sufficient, then, in a second optimization phase, correction operations may be introduced. The latter may be solved by allowing real values for the expansion factors introduced by them. In a second phase, the expansion factors introduced by correction operations may be replaced by integers, e.g., by rounding the correction operation's expansion factors, e.g., rounding them up. If replacing by an integer does not degrade the accuracy too much, it may be kept as an integer multiplication, thus avoiding a PBS. In order to have integer multiplication, one may directly pick expansion factors such that their ratio is an integer: in our example, we could always pick do and $\alpha_1$ such that $\alpha_1/\alpha_0$ is an integer, allowing the correction operation to be an integer multiplication. Optimizing which correction operations to implement as an integer multiplication and which as a PBS, may be decided one by one, or it may be done with some algorithm, say, a genetic algorithm.

In an embodiment, an additional factor which can be used for optimization is introduced without introducing a new correction operation. This can be done to modify a further operation by adjusting its output. For example, in an embodiment, an expansion factor is applied to the output of a PBS; for example, a function $f(x)$ may be replaced by the function $\beta f(x)$, for an expansion factor $\beta$. If the input of the function is also adjusted to accommodate an expansion factor on an input layer, the function may be adjusted to $\beta f(x/a)$, taking into account an expansion factor $\alpha$. This approach is especially useful for functions that are implemented as a PBS in to the second computational network.

For example, to an activation function which is replaced by a PBS, one can add an expansion factor onto the output, e.g., replace Activation(x) by Activation'(x)=$\beta$*Activation (x), for some $\beta$. The value $\beta$ can be obtained by optimization under the constraints implied by the network, e.g., by join operations.

The expansion factor $\beta$ can be the product of any of the available $\alpha_i$ to some individual integer positive or negative powers. For example, one might have: $\beta=\alpha_0$, $\beta=\alpha_0*\alpha_1$, or $\beta=\alpha_0^{-1}*\alpha_1^{-2}$, etc. to give some examples. Consider as example, FIG. 5a. This fragment could be optimized better without adding a correction operation 525, e.g., without implementing a PBS on the left branch.

For example, one may apply a factor $1/\alpha_1$ factor to the output of the Relu_4 activation. This modifies the layer factor of layer 5 factor to $1/\alpha_1$ (compared to the original network). After the Conv_5, layer 6 now has a layer factor 1, since Conv_5 itself has an expansion factor of $\alpha_1$. At the join layer, e.g., layer 7, sources 6 and 3 are now homogenous, that is they have the same layer factor, and so the joint operation computation can be done properly: at the end, layer 7 has a layer factor of 1.

Another option in FIG. 5a would be to apply an expansion factor of @1 to the output of ReLu_2 and to consider that values used as input in Relu_4 have a layer factor $\alpha_0*\alpha_1$. This would also make the inputs to Add_6 homogenous, with a factor of @1. This method however might be less good than the one dealing only with an expansion factor on the output of Relu_4, since it may make some values, especially layer 4, grow by a significant factor (namely $\alpha_0*\alpha_1$), which may be less good for accuracy. Depending on the data set it may also be better. This can be resolved in the optimization.

In terms of performance, applying an expansion factor to the output of a PBS is preferable over adding a PBS or integer multiplication, since it does not add any extra operation. Moreover, this approach keeps all the expansion factors $\alpha_i$ independent, which makes it more likely that a good solution will be found.

In an embodiment, optimization may follow the following phases. In a first phase, a solution is sought without introducing correction operations or introducing new expansion factors, e.g., in the output of a PBS. For example, for all operations of the first computation network that involve a multiplication with real numbers, assign an expansion factor $\alpha_i$. Derive conditions on the expansion factors by determining how the expansion factors propagate. In particular, join operations that need homogenous inputs (e.g., add or sub or concatenation join functions) imply conditions on the expansion factors of its inputs. The optimization minimizes the size of the expansion factors $\{\alpha_i\}$, while giving a sufficiently good accuracy. If there are not many expansion factors, this can be done by exhaustive search, e.g., optionally using logarithmic search. If the number of expansion factors is larger any of existing optimization schemes may be used, e.g., hill-climbing possibly combined with a gradient-based method, etc.

In a second phase, correction operations are introduced, and an improved solution is sought, allowing the new expansion factors to be real numbers. Finally, if possible, a correction operation is joined with a preceding PBS, or is implemented as an inserted operation. In the latter case, the system tries to round the new factors to an integer so that the correction operation can be implemented without a PBS. Instead of rounding, the one can pick expansion factors so that their ratio is an integer. Finally, once expansions factors are known, one can replace matrices, e.g., weights by their corresponding integer weights, modify the corresponding bias and compensate the computation in the next activation or function which is replaced by a PBS.

For example, once an acceptable set of expansion factors have been found, such that the accuracy is close enough to the accuracy of the original network. A matrix W may be replaced with Round ($\alpha$W) using the corresponding expansion factor $\alpha$, the adding part of a matrix operation, e.g., the bias B can be replaced with $\alpha\beta$. An activation may be replaced by Activation'(x)=Activation(x/$\alpha_{in}$)/$\alpha_{out}$, where $\alpha_{in}$ is the appropriate factor of the input and $\alpha_{out}$ is the appropriate factor of the output (if any).

The conversion systems 114 and 200 may comprise a communication interface. The communication interfaces may be selected from various alternatives. For example, the interface may be a network interface to a local or wide area network, e.g., the Internet, a storage interface to an internal or external data storage, a keyboard, an application interface (API), etc. In particular, the communication interface may be configured to connect to a computer network. The communication interface may be used to receive a digital data set. The data set may comprise data items, e.g., parameters, values and the like indicating the first computation network and on which the conversion is to be performed by the system. The data may also include a sample set for evaluation of accuracy parameters. The data may also include a desired level of accuracy.

A conversion system such as system 114 and/or 200 may have a user interface, which may include well-known elements such as one or more buttons, a keyboard, display, touch screen, etc. The user interface may be arranged for accommodating user interaction for configuring the systems, applying the system to new data, etc. Storage may be implemented as an electronic memory, say a flash memory, or magnetic memory, say hard disk or the like. Storage may comprise multiple discrete memories together making up the storage. Storage may comprise a temporary memory, say a RAM. The storage may be cloud storage.

The systems, e.g., system 114, and 200, may be implemented in a single device. Typically, the system comprises one or more microprocessors which execute appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the evaluation of cryptographic primitives.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 6:
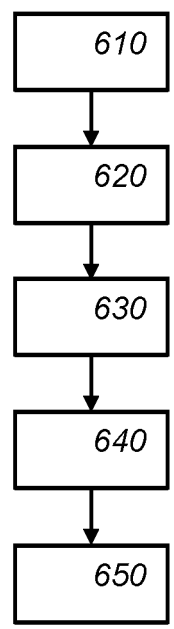

FIG. 6 schematically shows an example of an embodiment of a converting method 600. Method 600 is preferably executed on a computer, which may be a single computer device, or a system of multiple computer devices. Method 600 converts a first computation network of operations arranged to compute a function into a second computation network of FHE operations arranged to compute the same function. Method 600 comprises determining (610) a set of expansion factors, each of the matrix operations corresponding to an expansion factor, converting (620) a plurality of real-valued matrices (W) corresponding to the plurality of real-valued matrix operations to integer matrices by scaling the real-valued matrices with their corresponding expansion factor and rounding, adjusting (630) the plurality of further operations to receive as input a scaled result of a scaled matrix operation, the second computation network comprising the converted plurality of integer matrices and the adjusted plurality of further operations, determining (640) an accuracy measure for the second computation network indicating the accuracy of the second computation network, iteratively (650) optimizing the set of expansion factors to increase the accuracy measure. For example, the optimization may use parts of method 600, e.g., determining 610 may be done multiple times.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

The following numbered clauses include embodiments that are contemplated and nonlimiting:

1. A computer-implemented method for converting a first computation network of operations arranged to compute a function into a second computation network of FHE operations arranged to compute the same function,
    the first computation network of operations comprising a plurality of real-valued matrix operations (y=W·x) comprising a real-valued matrix multiplication and at least a plurality of further operations (z=Activation(y)) receiving as input a result of at least one of the plurality of real-valued matrix operations,
    converting the first computation network comprises
        determining a set of expansion factors ($\alpha_i$), each of the matrix operations corresponding to an expansion factor,
        converting a plurality of real-valued matrices (W) corresponding to the plurality of real-valued matrix operations to integer-valued matrices by scaling the real-valued matrices with their corresponding expansion factor and rounding,
            adjusting the plurality of further operations to receive as input a scaled result of a scaled matrix operation, the second computation network comprising the converted plurality of integer-valued matrices and the adjusted plurality of further operations,
        determining an accuracy measure for the second computation network indicating the accuracy of the second computation network,
        iteratively optimizing the set of expansion factors ($\alpha_i$) to improve the accuracy measure.

2. A converting method as in the previous clause, wherein an expansion factor is a real number, and/or
    at least part of the further operations is implemented in the second computation network as programmable bootstrapping.

3. A system for converting a first computation network of operations arranged to compute a function into a second computation network of FHE operations arranged to compute the same function, the system comprising
    a communication interface for receiving the first computation network of operations comprising a plurality of real-valued matrix operations (y=W·x) comprising a real-valued matrix multiplication and at least a plurality of further operations (z=Activation(y)) receiving as input a result of at least one of the plurality of real-valued matrix operations,
    a processor system configured for converting the first computation network, the converting comprising
        determining a set of expansion factors ($\alpha_i$), each of the matrix operations corresponding to an expansion factor,
        converting a plurality of real-valued matrices (W) corresponding to the plurality of real-valued matrix operations to integer matrices by scaling the real-valued matrices with their corresponding expansion factor and rounding,
            adjusting the plurality of further operations to receive as input a scaled result of a scaled matrix operation, the second computation network comprising the converted plurality of integer matrices and the adjusted plurality of further operations,
        determining an accuracy measure for the second computation network indicating the accuracy of the second computation network,
        iteratively optimizing the set of expansion factors ($\alpha_i$) to improve the accuracy measure.

Figure 7A:
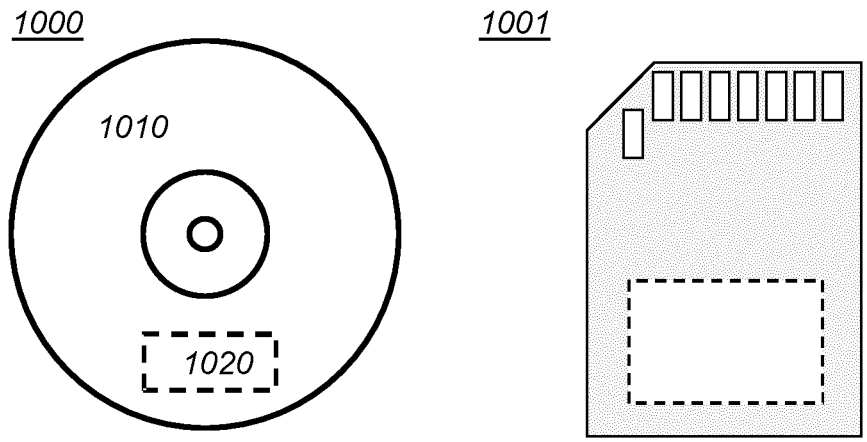

FIG. 7a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a conversion method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said conversion method. The computer readable medium may also or instead comprise the results of executing a method according to an embodiment, e.g., a second computational network.

Figure 7B:
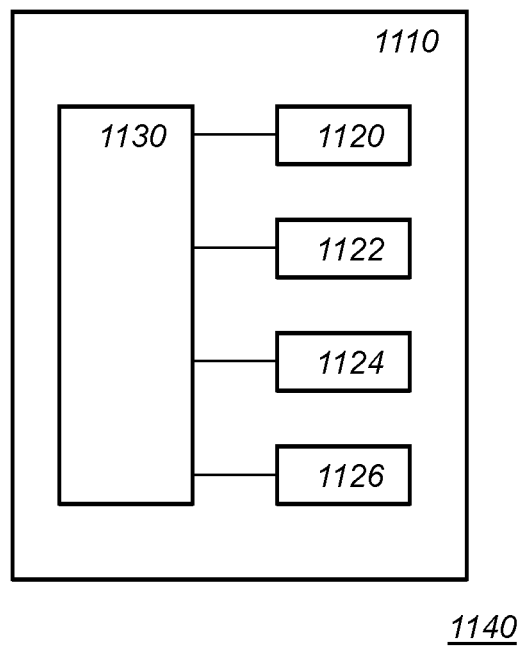

FIG. 7b shows in a schematic representation of a processor system 1140 according to an embodiment of an FHE device or system. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the FHE system or device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1110 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented method for converting a first computation network of operations arranged to compute a function into a second computation network of Fully Homomorphic Encryption operations arranged to compute the same function, wherein the second computation network comprises operations corresponding to the first computation network, the first computation network of operations comprising a plurality of real-valued matrix operations comprising a real-valued matrix multiplication and at least a plurality of further operations receiving as input a result of at least one of the plurality of real-valued matrix operations, converting the first computation network comprises determining a set of expansion factors, each of the matrix operations corresponding to an expansion factor, wherein an expansion factor is a real number, converting a plurality of real-valued matrices corresponding to the plurality of real-valued matrix operations to integer-valued matrices by scaling the real-valued matrices with their corresponding expansion factor and rounding the scaled real-valued matrices, adjusting the plurality of further operations to receive as input a scaled result of a scaled matrix operation, the second computation network comprising the converted plurality of integer-valued matrices and the adjusted plurality of further operations, determining an accuracy measure for the second computation network indicating the accuracy of the second computation network, iteratively optimizing the set of expansion factors to improve the accuracy measure, wherein the first computation network comprises a join operation, the join operation receiving a first input and a second input, a correcting operation being inserted in the second computation network to make the expansion factors at the join operation equal.

2. A converting method as in claim 1, wherein the first computation network and the second computation network are a neural network.

3. A converting method as in claim 1, wherein a real-valued matrix operation further comprises a real-valued matrix addition, converting the real-valued matrix operation further comprises scaling a matrix associated with the real-valued matrix addition with the same expansion factor.

4. A converting method as in claim 1, wherein at least part of the further operations is implemented in the second computation network as programmable bootstrapping.

5. A converting method as in claim 1, wherein determining a set of expansion factors comprises symbolically associating an expansion factor to the matrix operations in the first computation network, propagating the expansion factors through the first computation network and deriving conditions on the expansion factors from the operations in the first computation network applied to the output of a converting operation.

6. A converting method as in claim 5, wherein iteratively optimizing the set of expansion factors is subject to the conditions.

7. A converting method as in claim 1, comprising deriving the second computation network by replacing real-valued matrices by the corresponding scaled integer-valued matrices, replacing real-valued matrices for addition by the corresponding scaled matrices, and adjusting the operations in the further operations.

8. A converting method as in claim 5, wherein the first and second computation network comprises multiple layers between operations, each layer has an associated layer factor corresponding to a multiplicative ratio between a value in the layer in the first computation network and the corresponding value in the corresponding layer in the second computation network, the first computation network comprising a join operation, the join operation receiving a first input and a second input from two different layers, the expansion factors being determined under the condition that the two layer factors associated with the two different layers are equal, so that the join operation is homogeneous.

9. A converting method as in claim 8, wherein the join operation is one of addition, subtraction, or concatenation, wherein the join operation is implemented as a corresponding addition, subtraction, or concatenation on encrypted values in the second computational network.

10. A converting method as in claim 1, wherein the second computation network comprises inserted operations, a correcting operation being inserted in the second computation network to make the expansion factors at a next operation are equal, —the correcting operation is a programmable bootstrapping, and the correcting factor is a real number, or—the correcting operation is an integer-valued multiplication, and the correcting factor is an integer.

11. A converting method as in claim 1, wherein adjusting a further operation comprises—removing an expansion factor from the input, and/or—applying an expansion factor the output.

12. A converting method as in claim 1, wherein
the accuracy measure is computed by evaluating the first computation network and the second computation network on a set of sample inputs and comparing the evaluation results with a set of sample outputs obtaining a first accuracy for the first computation network and a second accuracy for the second computation network, the accuracy measure comparing the first and second accuracy, and/or
the accuracy measure is computed by evaluating second computation network on a set of sample inputs and comparing the evaluation results with a set of sample outputs obtaining a second accuracy for the second computation network, the accuracy measure comparing the second accuracy to a predetermined accuracy target.

13. A transitory or non-transitory computer readable medium comprising data representing any one of
instructions, which when executed by a processor system, cause the processor system to perform the method according to claim 1 and
data representing a second network obtained.

14. A system for converting a first computation network of operations arranged to compute a function into a second computation network of Fully Homomorphic Encryption operations arranged to compute the same function, wherein the second computation network comprises operations corresponding to the first computation network, the system comprising
a communication interface for receiving the first computation network of operations comprising a plurality of real-valued matrix operations comprising a real-valued matrix multiplication and at least a plurality of further operations receiving as input a result of at least one of the plurality of real-valued matrix operations,
a processor system configured for converting the first computation network, the converting comprising
determining a set of expansion factors, each of the matrix operations corresponding to an expansion factor, wherein an expansion factor is a real number,
converting a plurality of real-valued matrices corresponding to the plurality of real-valued matrix operations to integer matrices by scaling the real-valued matrices with their corresponding expansion factor and rounding the scaled real-valued matrices,
adjusting the plurality of further operations to receive as input a scaled result of a scaled matrix operation, the second computation network comprising the converted plurality of integer matrices and the adjusted plurality of further operations,
determining an accuracy measure for the second computation network indicating the accuracy of the second computation network,
iteratively optimizing the set of expansion factors to improve the accuracy measure, wherein the first computation network comprises a join operation, the join operation receiving a first input and a second input, a correcting operation being inserted in the second computation network to make the expansion factors at the join operation equal.

* * * * *